United States Patent
Seo et al.

(10) Patent No.: US 12,458,232 B2
(45) Date of Patent: Nov. 4, 2025

(54) MEDICAL IMAGE VISUALIZATION APPARATUS AND METHOD FOR DIAGNOSIS OF AORTA

(71) Applicant: CORELINE SOFT CO, LTD., Seoul (KR)

(72) Inventors: Hyungi Seo, Goyang-si (KR); Donghoon Yu, Gimpo-si (KR); Jaeyoun Yi, Seoul (KR); Jin Kook Kim, Seoul (KR); Sunggoo Kwon, Guri-si (KR); Seungbin Bae, Goyang-si (KR); GyeongHyeon Bae, Seoul (KR)

( * ) Notice: Subject to any disclaimer, the term of this patent is extended or adjusted under 35 U.S.C. 154(b) by 411 days.

(21) Appl. No.: 18/076,513

(22) Filed: Dec. 7, 2022

(65) Prior Publication Data
US 2023/0172451 A1 Jun. 8, 2023

(30) Foreign Application Priority Data

Dec. 7, 2021 (KR) .................. 10-2021-0173370
Sep. 19, 2022 (KR) .................. 10-2022-0118113

(51) Int. Cl.
*A61B 5/00* (2006.01)
*A61B 5/02* (2006.01)
(Continued)

(52) U.S. Cl.
CPC ........ *A61B 5/0033* (2013.01); *A61B 5/02007* (2013.01)

(58) Field of Classification Search
CPC .............. A61B 5/0033; A61B 5/02007; A61B 2505/05; A61B 2576/02; A61B 5/004;
(Continued)

(56) References Cited

U.S. PATENT DOCUMENTS 8,285,011 B2 * 10/2012 Chen .................... G06T 7/0012
382/128
10,327,724 B2 6/2019 Dehghan Marvast et al.
(Continued)

FOREIGN PATENT DOCUMENTS

KR 10-2021-0115012 A 9/2021

OTHER PUBLICATIONS

Polanczyk, Andrzej et al. "Shape and Enhancement Analysis as a Useful Tool for the Presentation of Blood Hemodynamic Properties in the Area of Aortic Dissection." Journal of clinical medicine vol. 9,5 1330. May 2, 2020, doi:10.3390/jcm9051330 (Year: 2020).*
(Continued)

*Primary Examiner* — Bobbak Safaipour
*Assistant Examiner* — Joshua Chen
(74) *Attorney, Agent, or Firm* — United One Law Group LLC; Kongsik Kim; Jhongwoo Peck

(57) ABSTRACT

An apparatus includes a communication interface and at least one processor. The processor is configured to obtain a size of a lumen in each of a plurality of aortic zones and first information for each of the plurality of aortic zones based on segmentation results of an aorta and the plurality of aortic zones within the aorta; and visualize the size of the true lumen, the first information, and a ratio between the size of the true lumen and the first information in each of the plurality of aortic zones by using a visualization segment corresponding to each of the plurality of aortic zones.

20 Claims, 20 Drawing Sheets

(51) Int. Cl.
 *A61B 5/107* (2006.01)
 *G06T 7/00* (2017.01)
 *G06T 7/11* (2017.01)

(58) Field of Classification Search
 CPC . A61B 5/02014; A61B 5/1075; A61B 5/1079; A61B 5/7282; G06T 2207/10081; G06T 2207/10088; G06T 2207/10132; G06T 2207/20084; G06T 2207/30101; G06T 7/0014; G06T 7/11
 See application file for complete search history.

(56) References Cited

U.S. PATENT DOCUMENTS

| | | |
|---|---|---|
| 10,588,590 B2 * | 3/2020 | Dehghan Marvast . G16H 50/20 |
| 10,685,438 B2 * | 6/2020 | Reda ................... G06T 7/12 |
| 10,733,265 B2 | 8/2020 | Dehghan Marvast et al. |
| 10,896,507 B2 * | 1/2021 | Burris ................ G06T 7/0014 |
| 2010/0309198 A1 * | 12/2010 | Kauffmann ............ G06T 7/149 |
| | | 382/128 |
| 2020/0118688 A1 | 4/2020 | Pasta et al. |
| 2020/0229796 A1 | 7/2020 | Yang |
| 2021/0150708 A1 | 5/2021 | Minion |
| 2023/0162493 A1 * | 5/2023 | Worrell ................. G06T 7/11 |
| | | 382/118 |

OTHER PUBLICATIONS

Lombardi et al. "Society for Vascular Surgery (SVS) and Society of Thoracic Surgeons (STS) Reporting Standards for Type B Aortic Dissections," The Society of Thoracic Surgeons and the Society for Vascular Surgery, 2020.

* cited by examiner

MEDICAL IMAGE VISUALIZATION APPARATUS AND METHOD FOR DIAGNOSIS OF AORTA

CROSS-REFERENCE TO RELATED APPLICATION

This application claims under 35 U.S.C. § 119(a) the benefit of Korean Patent Application Nos. 10-2021-0173370 and 10-2022-0118113 filed on Dec. 7, 2021 and Sep. 19, 2022, respectively, which are incorporated herein by reference in their entireties.

TECHNICAL FIELD

The present invention relates to a medical image diagnosis assistance apparatus and method. More particularly, the present invention relates to a computing system for analyzing medical images and software running on the computing system that are directed to technology that detects and visualizes the pathological information of the aorta such as an aortic dissection and/or an aortic aneurysm.

BACKGROUND ART

Currently, medical images such as computed tomography (CT) images are widely used for diagnoses made by analyzing lesions. For example, chest CT images are frequently used for diagnoses because abnormalities in the inside of the body, e.g., the lungs, the bronchial tubes, and the heart, can be observed therefrom.

Some findings that may be diagnosed through chest CT images are not easy to diagnose to the extent that radiologists can distinguish their features and forms only after many years of training, so that human doctors may easily overlook them. In order to assist the diagnosis of images that may be easily overlooked by humans, the need for computer-aided diagnosis (CAD) has emerged. The conventional CAD technology only assists the decision making of a doctor in a considerably limited area.

The aorta is the largest artery in the body. It originates from the left ventricle and distributes oxygenated blood to all other parts of the body. The aorta can be divided into two main regions, i.e., the thoracic aorta and the abdominal aorta.

The thoracic aorta can be divided into three main regions, i.e., the ascending aorta, the aortic arch, and the descending aorta. At least one piece of pathological information, such as an aortic dissection, an aortic rupture, or an aortic aneurysm, may be detected in at least one of various regions and sections within the aorta. An aortic dissection may occur when a tear in the inside of the intimal wall of the aorta allows blood to enter between the outer and intimal walls of the blood vessel.

An aortic aneurysm may occur when the aorta dilates, and an aortic wall may become thin due to such an aortic aneurysm. An aortic dissection or an aortic aneurysm may cause ischemia or aortic rupture, resulting in a life-threatening medical emergency.

U.S. Pat. No. 10,327,724 entitled "Detection and Characterization of Aortic Pathologies" discloses a configuration that detects the boundaries of the aorta from a medical image, such as a CT image or a magnetic resonance imaging (MRI) image, including anatomical information, and detects a dangerous area, such as the area of an aortic dissection or an aortic aneurysm, based on information about the anatomical structure of the aorta. Furthermore, in U.S. Pat. No. 10,327,724, there is disclosed a configuration in which when pathological information about the aorta, such as an aortic dissection or an aortic aneurysm, is detected, a suitable treatment is searched for in a medical knowledge database and is suggested to a user.

U.S. Pat. No. 10,733,265 entitled "Medical Image Manager with Automated Synthetic Image Generator" discloses a configuration that detects an anatomical structure, such as the aorta, using signal intensity in a medical image, such as a CT or MRI image, including anatomical information, detects the pathological information of the aorta such as an aortic dissection, generates a report based on the detected medical information, and provides the report to a user who is a medical professional.

U.S. Patent Application Publication No. 2020/0118688 entitled "Method and System for the Evaluation of the Risk of Aortic Rupture or Dissection in an Individual with an Ascending Thoracic Aortic Aneurysm" discloses a method for calculating the risk of developing an aortic rupture or an aortic dissection for an individual having an ascending thoracic aortic aneurysm (ATAA). In U.S. Patent Application Publication No. 2020/0118688, information about the anatomical structure of the aorta is extracted from a medical image, parametric information is obtained by applying a finite element method (FEM), and the risk of rupture or aortic dissection is calculated based on the parametric information.

Even in the case of these prior arts, there is a problem in that a user interface that can easily assist a user who is a medical professional in diagnosing aortic disease is still absent.

SUMMARY OF THE DISCLOSURE

An object of the present invention is to provide a user interface that assists the diagnosis of a user so that the user can easily make a diagnosis based on the results of detection and/or analysis of the pathological information of the aorta, including an aortic aneurysm and/or an aortic dissection, based on artificial intelligence/an artificial neural network.

An object of the present invention is to provide an intuitive visualization method that effectively assists a user in diagnosing the pathological information of the aorta including an aortic aneurysm and/or an aortic dissection.

An object of the present invention is to provide an intuitive user interface that enables a user to check whether aortic disease including an aortic aneurysm and/or an aortic dissection has occurred with respect to the detailed structure information of the aorta in an integrated manner.

Even for a user who is a medical professional, the time and accuracy regarding reaching a diagnosis or a decision based on image analysis results overlaid on a medical image, pathological information, or medical findings may vary depending on the proficiency of an individual operator.

Furthermore, since the degree of urgency and a treatment method vary depending on the location on the aorta where an aortic aneurysm or an aortic dissection is detected, there is required a visualization user interface that may provide intuitive notification of the location where an aortic aneurysm or an aortic dissection is detected in the overall structure of the aorta.

An object of the present invention is to provide a user interface that visualizes the location where an aortic aneurysm or an aortic dissection has occurred in the overall structure of the aorta in an intuitive manner.

An object of the present invention is to provide a user interface that visualizes the location where an aortic aneurysm or an aortic dissection has occurred in the overall structure of the aorta in an intuitive manner and also assists the diagnosis of a user in order to allow the user to rapidly select a treatment method.

According to an embodiment of the present invention, there is provided a medical image diagnosis assistance apparatus comprising a computing system, wherein the computing system comprises: a communication interface configured to receive a medical image acquired for an anatomical structure inside a human body; and at least one processor. The at least one processor is configured to: obtain a size of a lumen including an area surrounded by an intima in each of a plurality of aortic zones and first information for each of the plurality of aortic zones based on results of segmentation of an aorta in the medical image and results of segmentation of the plurality of aortic zones within the aorta; and visualize the size of the true lumen, the first information, and a ratio between the size of the true lumen and the first information in each of the plurality of aortic zones by using a visualization segment corresponding to each of the plurality of aortic zones.

The at least one processor may be further configured to obtain a size of a reference true lumen corresponding to a size of a normal aorta of each of the plurality of aortic zones as the first information for each of the plurality of aortic zones.

The at least one processor may be further configured to generate the visualization segment by which the size of the true lumen, the size of the reference true lumen, and a ratio between the size of the true lumen and the size of the reference true lumen are visualized as diagnosis assistance information for a diagnosis of an aortic aneurysm in each of the plurality of aortic zones.

The at least one processor may be further configured to obtain a size of a false lumen including an area between the intima and an adventitia for each of the plurality of aortic zones as the first information for each of the plurality of aortic zones.

The at least one processor may be further configured to generate the visualization segment by which the size of the true lumen, the size of the false lumen, and a ratio between the size of the true lumen and the size of the false lumen are visualized as diagnosis assistance information for a diagnosis of an aortic dissection in each of the plurality of aortic zones.

The at least one processor may be further configured to: obtain a size of a reference true lumen corresponding to a size of a normal aorta of each of the plurality of aortic zones as second information for each of the plurality of aortic zones; and generate the visualization segment that is visualized such that the size of the true lumen, the size of the false lumen, and the size of the reference true lumen can be compared with each other.

The at least one processor may be further configured to generate the visualization segment including a first subsegment having a size proportional to the size of the true lumen and a second sub-segment having a size proportional to the first information.

The at least one processor may be further configured to generate the visualization segment having a first size corresponding to a ratio between a length of each of the plurality of aortic zones and a total length of the aorta.

The at least one processor may be further configured to generate the visualization segment including identification information indicating that the visualization segment corresponds to one of the plurality of aortic zones.

The at least one processor may be further configured to generate diagnosis assistance information for each of the plurality of aortic zones by disposing the visualization segment to correspond to a location of each of the plurality of aortic zones.

The at least one processor may be further configured to generate diagnosis assistance information for each of the plurality of aortic zones by radially disposing the visualization segment, sharing a center point of an imaginary circle, from a center point.

The at least one processor may be further configured to visualize the size of the true lumen and the first information in proportion to a length of a radius from the center point of the visualization segment.

According to an embodiment of the present invention, there is provided a medical image diagnosis assistance method for assisting diagnosis of a medical image, the medical image diagnosis assistance method being performed by a medical image diagnosis assistance apparatus, wherein the medical image diagnosis assistance apparatus comprises at least one processor. The medical image diagnosis assistance method comprising: receiving, by the at least one processor, a medical image acquired for an anatomical structure inside a human body via a communication interface; obtaining, by the at least one processor, a size of a lumen including an area surrounded by an intima in each of a plurality of aortic zones and first information for each of the plurality of aortic zones based on results of segmentation of an aorta in the medical image and results of segmentation of the plurality of aortic zones within the aorta; and visualizing, by the at least one processor, the size of the true lumen, the first information, and a ratio between the size of the true lumen and the first information in each of the plurality of aortic zones by using a visualization segment corresponding to each of the plurality of aortic zones.

The obtaining may comprise obtaining, by the at least one processor, a size of a reference true lumen corresponding to a size of a normal aorta of each of the plurality of aortic zones as the first information for each of the plurality of aortic zones. The visualizing may comprise generating, by the at least one processor, the visualization segment by which the size of the true lumen, the size of the reference true lumen, and a ratio between the size of the true lumen and the size of the reference true lumen are visualized as diagnosis assistance information for a diagnosis of an aortic aneurysm in each of the plurality of aortic zones.

The obtaining may comprise obtaining, by the at least one processor, a size of a false lumen including an area between the intima and an adventitia for each of the plurality of aortic zones as the first information for each of the plurality of aortic zones. The visualizing may comprise generating, by the at least one processor, the visualization segment by which the size of the true lumen, the size of the false lumen, and a ratio between the size of the true lumen and the size of the false lumen are visualized as diagnosis assistance information for a diagnosis of an aortic dissection in each of the plurality of aortic zones.

The visualizing may comprise: generating, by the at least one processor, a first sub-segment having a size proportional to the size of the true lumen; generating, by the at least one processor, a second sub-segment having a size proportional to the first information; and generating, by the at least one processor, the visualization segment including the first sub-segment and the second sub-segment.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Figure 1:
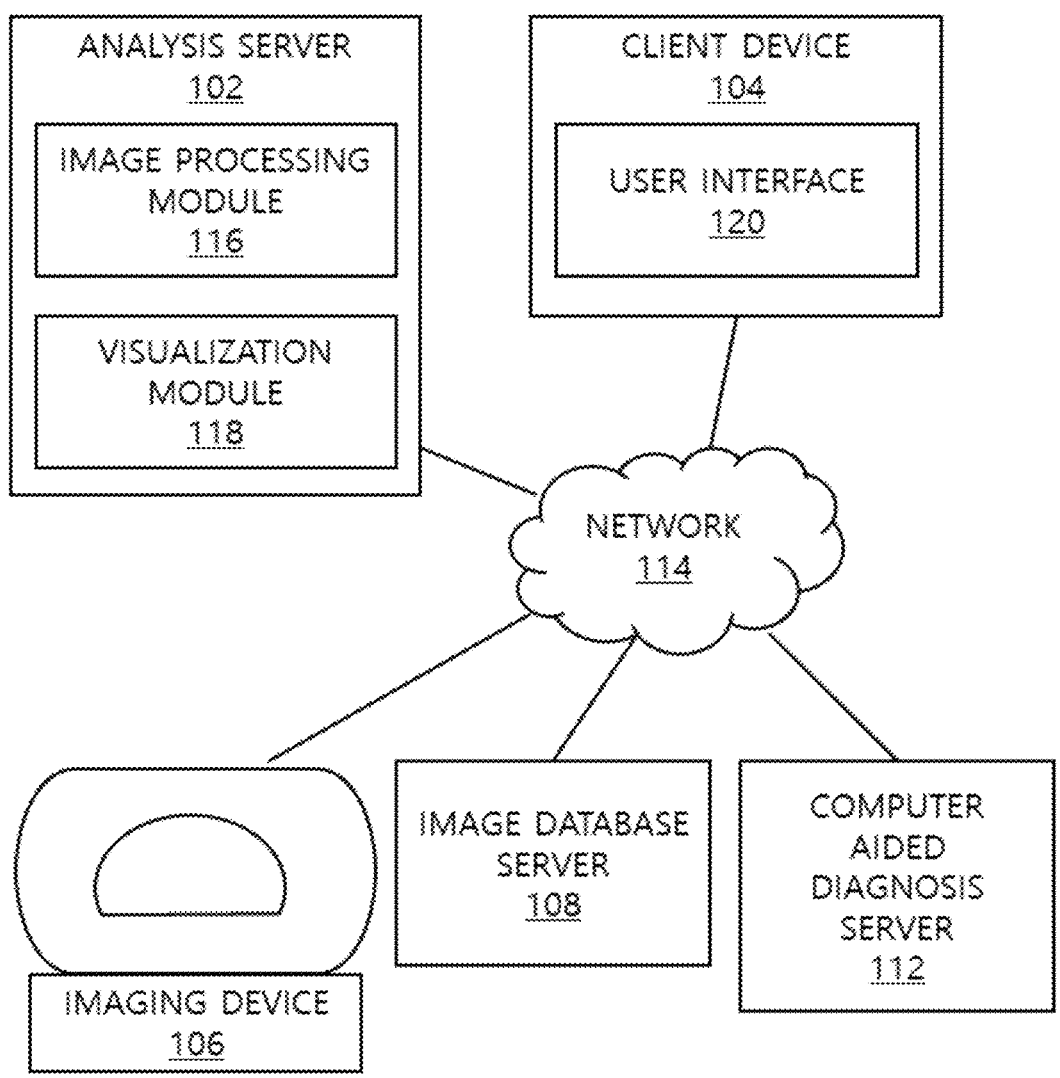
FIG. 1 is a diagram showing a medical image diagnosis workflow that is performed in a system including a medical image diagnosis assistance apparatus according to an embodiment of the present invention.

Other objects and features of the present invention in addition to the above-described objects will be apparent from the following description of embodiments to be given with reference to the accompanying drawings.

The embodiments of the present invention will be described in detail below with reference to the accompanying drawings. In the following description, when it is determined that a detailed description of a known component or function may unnecessarily make the gist of the present invention obscure, it will be omitted.

The spirit of the present invention should not be understood to be limited by the examples. The same reference numerals in each figure may indicate the same elements. Length, height, size, width, and so on, which is introduced in the embodiments and drawings of the present invention may be understood to be exaggerated for better understanding.

Deep learning/CNN-based artificial neural network technology, which has recently developed rapidly, is considered for the purpose of identifying a visual element that is difficult to identify with the human eye when it is applied to the imaging field. The fields of application of the above technology are expected to expand to various fields such as security, medical imaging, and non-destructive testing.

For example, in the field of medical imaging, there are cases where a tissue in question is not immediately diagnosed as a cancer tissue in a biopsy state but whether it is a cancer tissue is determined only after being monitored from a pathological point of view. Although it is difficult to confirm whether a corresponding cell is a cancer tissue in a medical image with the human eye, there is an expectation that the application of artificial neural network technology may acquire more accurate prediction results than observation with the human eye.

It is expected that this artificial neural network technology is applied and performs the analysis process of detecting a disease or lesion difficult to identify with the human eye in a medical image, segmenting a region of interest such as a specific tissue, and measuring the segmented region.

As to recent medical images such as CT or MRI images, a series of medical images is acquired through a single acquisition process, and the series of medical images is not limited to a single type of lesion but may also be used to detect various types of lesions. For example, for the lungs, a lung nodule as well as chronic obstructive pulmonary disease (COPD) may be diagnosed, emphysema may be diagnosed, and/or chronic bronchitis and/or an airway-related disease may also be diagnosed.

Diagnosis using a medical image refers to a process in which a medical professional identifies a disease or lesion that has occurred in a patient. In this case, prior to diagnosis using a medical image, a medical professional analyzes the medical image and detects a disease or lesion appearing in the medical image. A primary opinion on the detection of a disease or lesion on a medical image is referred to as "findings," and the process of deriving findings by analyzing a medical image is referred to as "reading."

Diagnosis using a medical image is made in such a manner that a medical professional analyzes the findings, derived through the process of reading the medical image, again. In this process, role can be frequently shared in such a manner that a radiologist reads a medical image and derives findings and a clinician derives a diagnosis based on a reading result and the findings.

The assistance of the diagnosis of a medical image by an artificial intelligence has a considerably comprehensive meaning, and may be classified into the case of assisting the medical diagnosis by providing findings based on a medical image processing and/or analysis result, the case of assisting the process of reading a medical image, the case of assisting the diagnosis of the reading result of a medical image, and the case of assisting decision-making on a medical action such as treatment, administration, or surgery based on the diagnosis result of a medical image. The artificial intelligence can assist at least a part of the process of medical diagnosis by analyzing/processing the medical images such as detecting lesion/illness, segmenting an ROI, classification, quantitative measurement, and/or decision-making. The artificial intelligence can assist at least a part of the process of medical diagnosis by providing and/or generating additive/incidental information requested by the medical professionals. The aorta is a blood vessel having a strong, thick wall, and consists of three layers: the innermost intima, the media mainly composed of muscles, and the outermost adventitia. Aortic dissection refers to a disease in which blood in the aortic lumen flows into the aortic media due to an intimal tear of the aorta for some reason and the aortic wall is separated into an inner layer and an outside due to the inflow blood. The condition within two weeks from the onset of aortic dissection is called acute aortic dissection, and the condition thereafter is called chronic aortic dissection.

The most common cause of aortic dissection is hypertension. It is known that about 80% of patients with acute aortic dissection have hypertension. Causes other than hypertension include trauma, aortic constriction, and stratified necrosis.

The types of aortic dissection are classified according to the location of an intimal tear, and treatment methods are different for the types of aortic dissection. According to the Stanford Classification, aortic dissection occurring in the ascending aorta is called Type A, and aortic dissection occurring in the descending aorta is called Type B.

The results of studies show that in the case of acute aortic dissection involving only the descending aorta, the one-month survival rate without surgical treatment is about 75%, and also show that in the case of acute aortic dissection involving the ascending aorta, 50% of patients are dead within two days without surgical treatment and 90% of patients are dead within one month without surgical treatment.

An aortic aneurysm refers to a condition in which part of an arterial blood vessel dilates and takes the form of a balloon. Aneurysms may occur anywhere in the arteries of the body, including the brain, the heart, and the lower extremities. The most common and most problematic location for aneurysms is the aorta.

A condition in which part of the aorta is dilated to 1.5 times or more the diameter of a normal aorta is called an aortic aneurysm. According to known studies, 75% of aortic aneurysms occur in the abdominal aortas and 25% thereof occur in the thoracic aortas. It is known that aortic aneurysms occur more frequently in people older than 60 years of age with hypertension, coronary artery disease, or vascular disease, smokers, and people with a family history of an abdominal aortic aneurysm.

It is significantly important to identify the location of an aortic aneurysm early because the degree of urgency and a treatment method may vary depending on the type of aortic aneurysm based on the location of the aortic aneurysm, such as a thoracic aortic aneurysm, an abdominal aortic aneurysm, an ascending aortic aneurysm, or a descending aortic aneurysm.

In addition, aortic aneurysms are often found incidentally during routine check-ups or diagnoses attributable to other diseases while most of the people live their daily life without symptoms. Accordingly, it is considerably important to introduce an effective visualization means that can increase the possibility of early detection of aortic aneurysms.

Therefore, the present invention intends to propose an intuitive user interface that enables a user to check whether aortic disease including an aortic aneurysm and/or an aortic dissection has occurred with respect to the detailed structure information of the aorta in an integrated manner.

The present invention intends to propose a visualization user interface that visualizes the location where an aortic aneurysm or an aortic dissection has occurred in the overall structure of the aorta in an intuitive manner because the degree of urgency and a treatment method vary depending on the location on the aorta where an aortic aneurysm or an aortic dissection is detected.

The present invention intends to propose a user interface that visualizes the location where an aortic aneurysm or an aortic dissection has occurred in an intuitive manner and also assists the diagnosis of a user in order to allow the user to rapidly select a treatment method.

Among the components of the present invention, known to those of ordinary skill in the art prior to the filing of the present application will be described as parts of the components of the present invention in the present specification when necessary. However, if it is determined that a fact obvious to those of ordinary skill in the art may make the gist of the invention obscure, a description thereof may be omitted. In addition, descriptions of the components omitted therein may be replaced by providing notification that the components are known to those of ordinary skill in the art via the related art documents, e.g., U.S. Pat. No. 10,327,724 "Detection and characterization of aortic pathologies", U.S. Pat. No. 10,733,265 "Medical image manager with automated synthetic image generator", US Patent Publication 2020-0118688 "METHOD AND SYSTEM FOR THE EVALUATION OF THE RISK OF AORTIC RUPTURE OR DISSECTION IN AN INDIVIDUAL WITH AN ASCENDING THORACIC AORTIC ANEURYSM", US Patent Publication 2021-0150708 "SYSTEM AND METHOD FOR ANATOMIC CLASSIFICATION OF AORTIC ANATOMY IN ANEURYSMS", KR Patent Publication 10-2021-0115012 "System and method for abdominal aortic aneurysm quantitative analysis using 3-dimensional ultrasound medical images", "Society for Vascular Surgery (SVS) and Society of Thoracic Surgeons (STS) reporting standards for type B aortic dissections", Joseph V. Lombardi, etc., that are cited therein.

In the above-described related documents, lesion candidates are detected using an artificial neural network and classified, and findings are then generated. Each of the findings includes diagnosis assistance information, and the diagnosis assistance information may include quantitative measurements such as the probability that the finding corresponds to an actual lesion, the confidence of the finding, and the malignity, size and volume of the corresponding one of the lesion candidates to which the findings correspond.

In medical image reading assistance using an artificial neural network, each finding must include numerically quantified probability or confidence as diagnosis assistance information. Since all findings may not be provided to a user, the findings are filtered by applying a predetermined threshold, and only passed findings are provided to the user.

Some of the contents disclosed in these related art documents may be related to the objects to be achieved by the present invention, and some of the solutions adopted by the present invention may be applied to these related art documents in the same manner.

The present invention is directed to an apparatus and method for assisting diagnosis using a medical image. Specifically, the present invention is directed to a medical image analysis apparatus and method for automatically analyzing and storing a medical image to assist diagnosis using the medical image, and is also directed to a medical image visualization apparatus and method for assisting the reading of a medical image by using the analysis result of the medical image. The medical image analysis apparatus and method and the medical image visualization apparatus and method according to the present invention are all implemented by a computing system and software executed in the computing system.

In the following description to be given in conjunction with FIGS. 1 to 20, the descriptions of items that are considered to be well-known techniques widely known in the technical field of the present invention may be omitted as necessary in order to prevent the gist from being obscured, or may be replaced by citing the related art documents.

Furthermore, some or all of the configurations disclosed in the related art documents cited above and to be cited later may be related to some of the objects to be achieved by the present invention, and some of the solutions adopted by the present invention may be borrowed from the related art documents.

The items included to embody the present invention among the items disclosed in the related art documents can be considered to be parts of the components of the present invention.

Details of the present invention will be described below with reference to the embodiments of FIGS. 1 to 20.

FIG. 1 is a diagram showing a medical image diagnosis workflow that is performed in a system including a medical image diagnosis assistance apparatus according to an embodiment of the present invention.

The medical image diagnosis assistance apparatus according to the embodiment of the present invention may be implemented as the analysis server 102 shown in FIG. 1.

The analysis server 102 is a medical image diagnosis assistance apparatus for assisting the diagnosis of a medical image, and may include a computing system.

The analysis server 102 may receive a medical image including information about an anatomical structure inside the human body. The medical image may be acquired by an imaging device 106. The imaging device 106 may be a modality capable of acquiring information about an anatomical structure inside the human body, such as a CT, MRI, or ultrasound image.

A medical image may be stored in an image database server 108. The analysis server 102 may receive a medical image from the imaging device 106 over a network 114, or may receive a medical image stored in the image database server 108 over the network 114. The image database server 108 may be a picture archive and communication system (PACS), a hospital information system (HIS), or a clinical information system (CIS).

The analysis server 102 may process a medical image by the execution of an image processing module 116. As a result of image processing of a medical image, segmentation results for an anatomical structure in the medical image and quantitative analysis results may be obtained. The image processing module 116 may be implemented as program instructions or software that can be executed in a computer device. Alternatively, the image processing module 116 may be implemented as dedicated hardware for running a specific program or specific software.

In order to obtain anatomical structure segmentation results and quantitative analysis results in a medical image, the analysis server 102 may cooperate with an external computer-aided diagnosis server 112 or may request some functions 14 to be executed by the computer-aided diagnosis server 112 via the network 114.

In the analysis server 102, a segmentation result for an anatomical structure in a medical image and a quantitative analysis result may be visualized by the execution of a visualization module 118. The visualization module 118 may generate visualization information by referring to the segmentation result for the anatomical structure in the medical image and the quantitative analysis result. The visualization module 118 may be implemented as program instructions or software that can be executed on a computer device. Alternatively, the visualization module 118 may be implemented as dedicated hardware for running a specific program or specific software.

The visualization information generated by the analysis server 102 may be provided to a client device 104 via the network 114. The client device 104 may provide visualization information to a user via a user interface 120.

Although an embodiment in which the analysis server 102 and the client device 104 are separated from each other is shown in FIG. 1, a medical image diagnosis assistance apparatus may include both the functions of an analysis server and a client device in another embodiment of the present invention, and may directly provide visualization information to a user. In this case, the medical image diagnosis assistance apparatus according to the embodiment of the present invention may further include a user interface in addition to the configuration of the analysis server 102 shown in FIG. 1.

Figure 2:
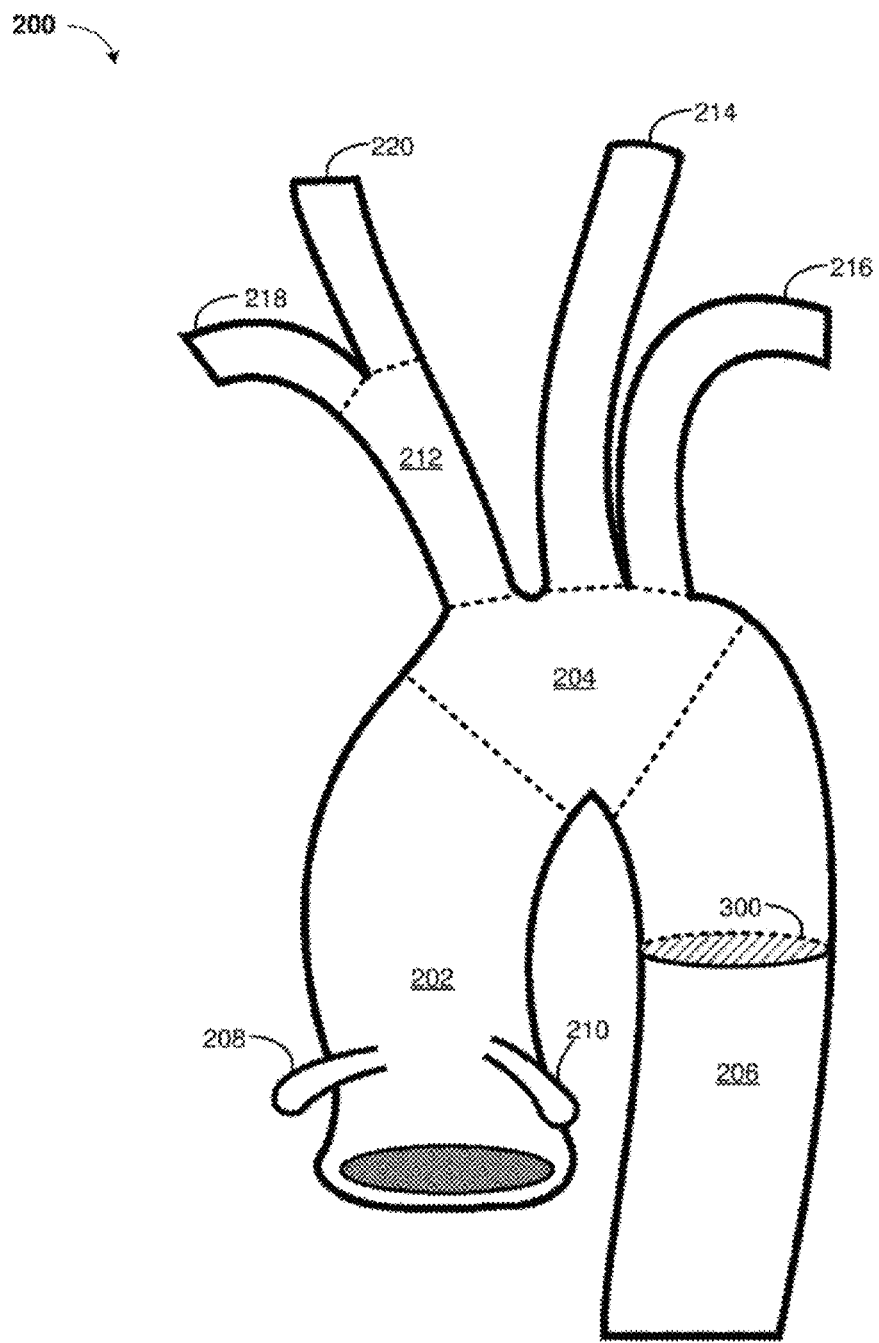
FIG. 2 is a conceptual diagram showing the structure of the thoracic aorta.

FIG. 2 is a conceptual diagram showing the structure of the thoracic aorta 200.

Referring to FIG. 2, the thoracic aorta 200 includes the ascending aorta 202, the aortic arch 204, and the descending aorta 206. The right coronary artery (RCA) 208 and the left coronary artery (LCA) 210 branch off the ascending aorta 202.

The brachiocephalic artery 212, the left common carotid artery 214, and the left subclavian artery 216 each branch off the aortic arch 204. The brachial artery 212 is in turn connected to the right subclavian artery 218 and the right common carotid artery 220. The abdominal aorta connected to the descending aorta 206 is not shown in FIG. 2. A tomographic scan image 300 may be acquired from any portion of the aorta. Although the tomographic scan image 300 is shown as a cross section of the descending aorta 206 in FIG. 2, the tomographic scan image 300 is also implemented as cross sections of the ascending aorta 202, the aortic arch 204, and the abdominal aorta.

Figure 3:
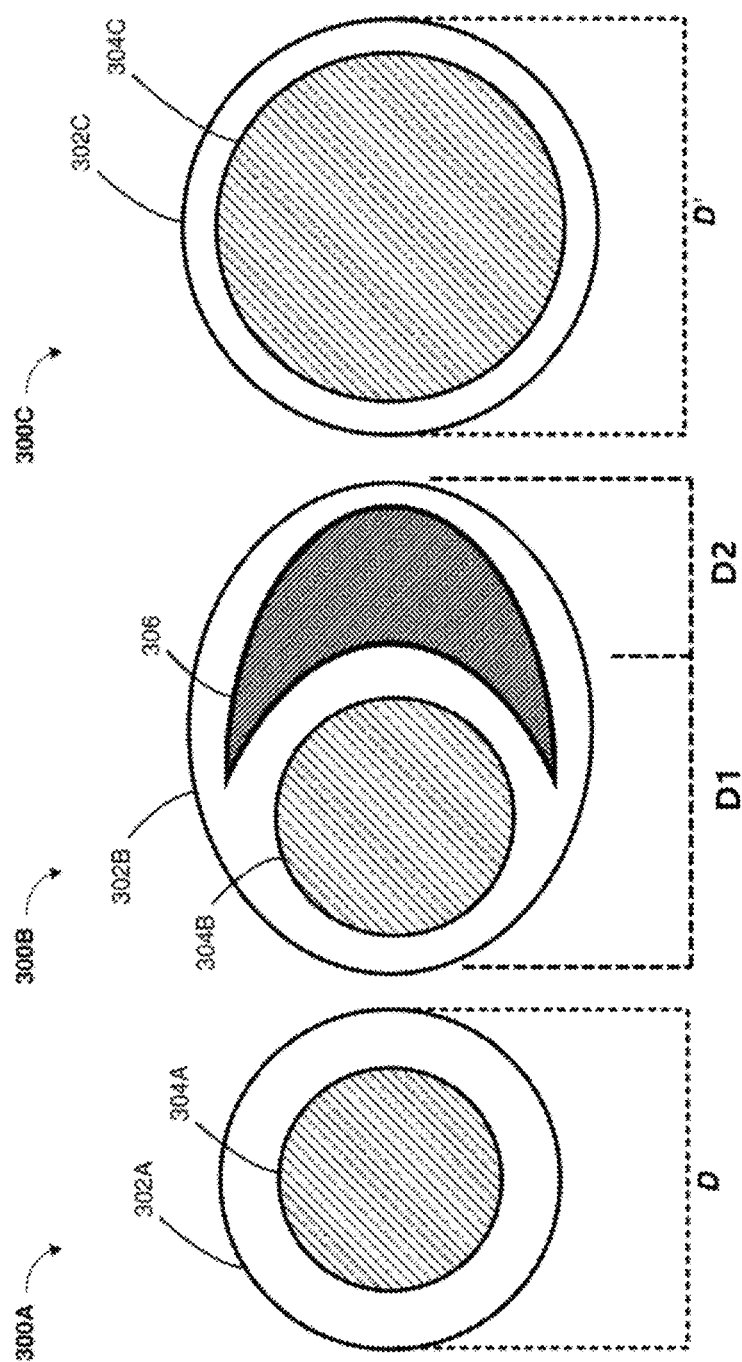
FIG. 3 shows conceptual diagrams showing cross sections of the thoracic aortae according to a plurality of pathological conditions.

FIG. 3 shows conceptual diagrams showing cross sections of the thoracic aortae according to a plurality of pathological conditions.

Referring to FIG. 3, there is shown a cross-sectional view 300A of the normal aorta. For ease of description, it is assumed that the normal aorta is the aorta that does not have diagnosable pathological information. The cross-sectional view 300A of the normal aorta shows a vascular wall 302A and a lumen 304A. Although the diameter D of the normal aorta including the vascular wall 302A is shown in FIG. 3, the diameter (not shown) of only the lumen 304A excluding the vascular wall 302A may be used as a quantitative indicator for the normal aorta according to another embodiment of the present invention.

Meanwhile, there is shown a cross-sectional view 300B that is viewed when an aortic dissection occurs. A vascular wall 302B, a true lumen 304B, and a false lumen 306 are shown in the cross-sectional view 300B. As described above, the cross-sectional view 300B may be shown for any one of the ascending aorta, the aortic arch, the descending aorta, and/or the abdominal aorta, and may be visualized for either a Type A aortic dissection or a Type B aortic dissection.

In FIG. 3, there is also shown a cross-sectional view 300C that is viewed when an aortic aneurysm occurs. A vascular wall 302C and a lumen 304C are shown in the cross-sectional view 300C. The diameter D' of the vascular wall 302C with the aortic aneurysm is shown as 1.5 times or more the diameter D of the vascular wall 302A in the cross-sectional view 300A of the normal aorta. An aneurysm is a bulge in an artery, and means part of a blood vessel that dilates and looks like a balloon. Although aneurysms may occur anywhere in the arteries of the body, such as the brain, the heart, and the lower extremities, they most commonly occur in the aorta.

A condition in which part of the aorta dilates such that the diameter thereof is 1.5 times or more the diameter of the normal aorta is called an aortic aneurysm. It is known that 75% of aortic aneurysms occur in the abdominal aortas and 25% thereof occur in the thoracic aortas. The cause of aortic aneurysms is known as arteriosclerosis, and other causes may include heredity, trauma, arteritis, congenital anomalies, syphilis, and fungal infection.

A medical image including a CT image may be analyzed using one or more qualitative methods such as visual landmark detection, false lumen detection, and/or ridge detection. In the case of an aortic dissection, the false lumen 306 may be identified using one or more of visual landmark detection, boundary detection, and circularity measurements. In order to identify the false lumen 306, there may be applied a technique for performing classification into blood, blood clots, and blood vessels depending on whether signal intensity included in a medical image is included in a predetermined known range.

In the cross-sectional view 300B, the true lumen 304B and the false lumen 306 may be identified, and the diameter D1 of the true lumen 304B and the diameter D2 of the false lumen 306 may be calculated. In this case, in an embodiment of the present invention, the total diameter D1+D2 of the cross-sectional view 300B of the aorta dilated in the direction in which the false lumen 306 protrudes may be calculated first, and the diameter D2 of the false lumen 306 may be calculated by subtracting the diameter D1 of the true lumen 304B from D1+D2. D1+D2 may be identified and calculated on a reference axis. D1 and D2 may also be identified and calculated on the reference axis.

Although an embodiment in which the vascular wall 302B is included in the calculation of D1 and D2 is shown in FIG. 3, the diameter of only the true lumen 304B excluding the vascular wall 302B may be calculated as D1 and also the diameter of only the false lumen 306 may be calculated as D2 in another embodiment of the present invention.

Figure 4:
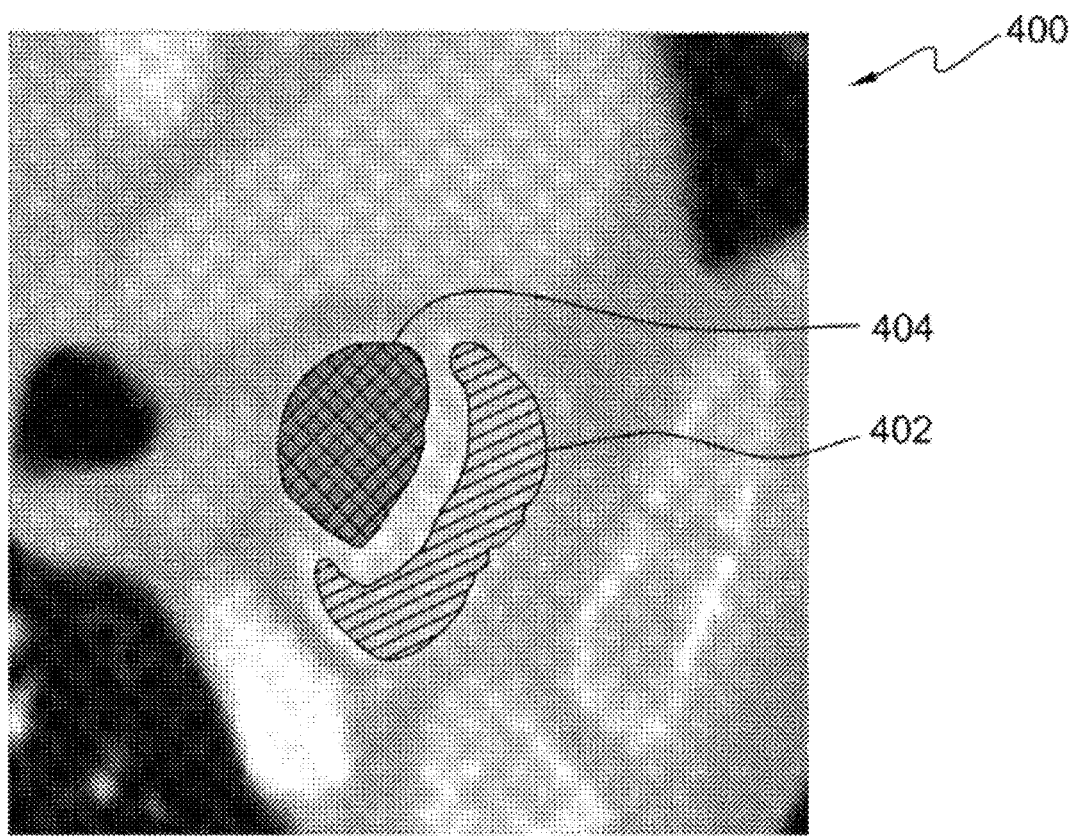
FIG. 4 shows an embodiment of a display image that is displayed such that a true lumen and a false lumen can be distinguished from each other on a medical image.

FIG. 4 shows an embodiment of a display image that is displayed such that a true lumen and a false lumen can be distinguished from each other on a medical image.

Referring to FIG. 4, there is shown an embodiment in which a true lumen 402 and a false lumen 404 are displayed and highlighted in a chest medical image 400 including the chest aorta. Techniques such as medical image segmentation, intra-medical image object detection, and intra-medical image thresholding may be applied as medical image analysis methods, the regions of the true lumen 402 and the false lumen 404 may be identified, and the boundaries thereof may be segmented. In the medical image 400, the regions and boundaries of the true lumen 402 and the false lumen 404 are distinguished by markers or masks, and markers or masks corresponding to the respective regions of the true lumen 402 and the false lumen 404 may be overlaid and visualized on the medical image 400.

Figure 5:
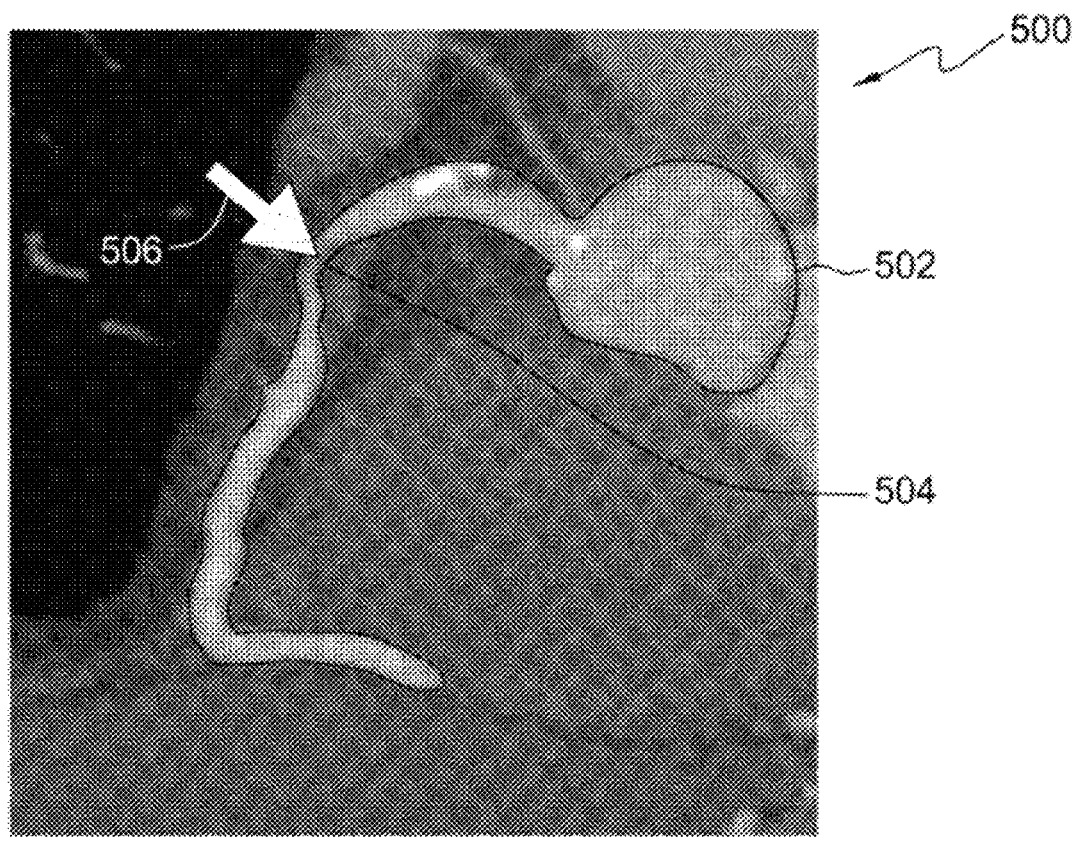
FIG. 5 is an embodiment of a display image that is displayed such that a coronary stenosis can be distinguished on a medical image.

FIG. 5 is an embodiment of a display image that is displayed such that a coronary stenosis can be distinguished on a medical image.

Referring to FIG. 5, a coronary vessel 502 and a coronary stenosis 504 are shown on a medical image 500 including a coronary artery. The coronary stenosis 504 may be highlighted with an arrow 506.

The medical image 500 may be analyzed by techniques such as medical image segmentation, intra-medical image landmark detection, and intra-medical image thresholding, and the coronary stenosis 504 may be identified by measuring or quantifying the diameter of the coronary artery.

Figure 6:
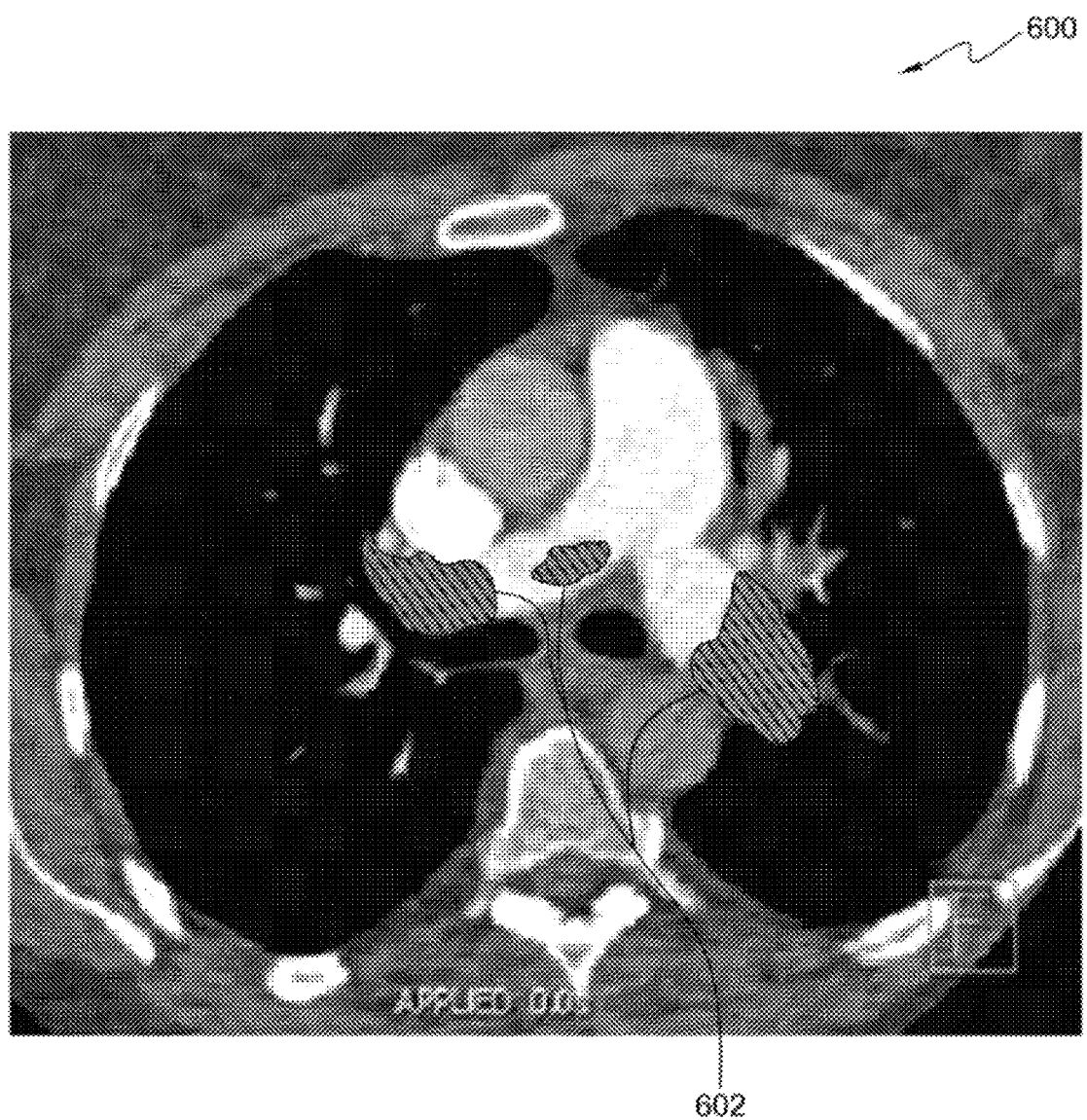
FIG. 6 is an embodiment of a display image that is displayed such that pulmonary embolism and blood clots in a pulmonary vessel are distinguished on a medical image.

FIG. 6 is an embodiment of a display image that is displayed such that pulmonary embolism and blood clots in a pulmonary vessel are distinguished on a medical image.

A medical image 600 is an axial view of a tomographic image. Blood clots 602 in a pulmonary vessel are identified by a medical image analysis technique, and markers or masks for the identified blood clots 602 may be overlaid on the medical image 600. The regions of the blood clots 602 may be displayed to be clearly distinguished from surrounding areas surrounding the blood clots 602 by overlaid markers or masks.

Figure 7:
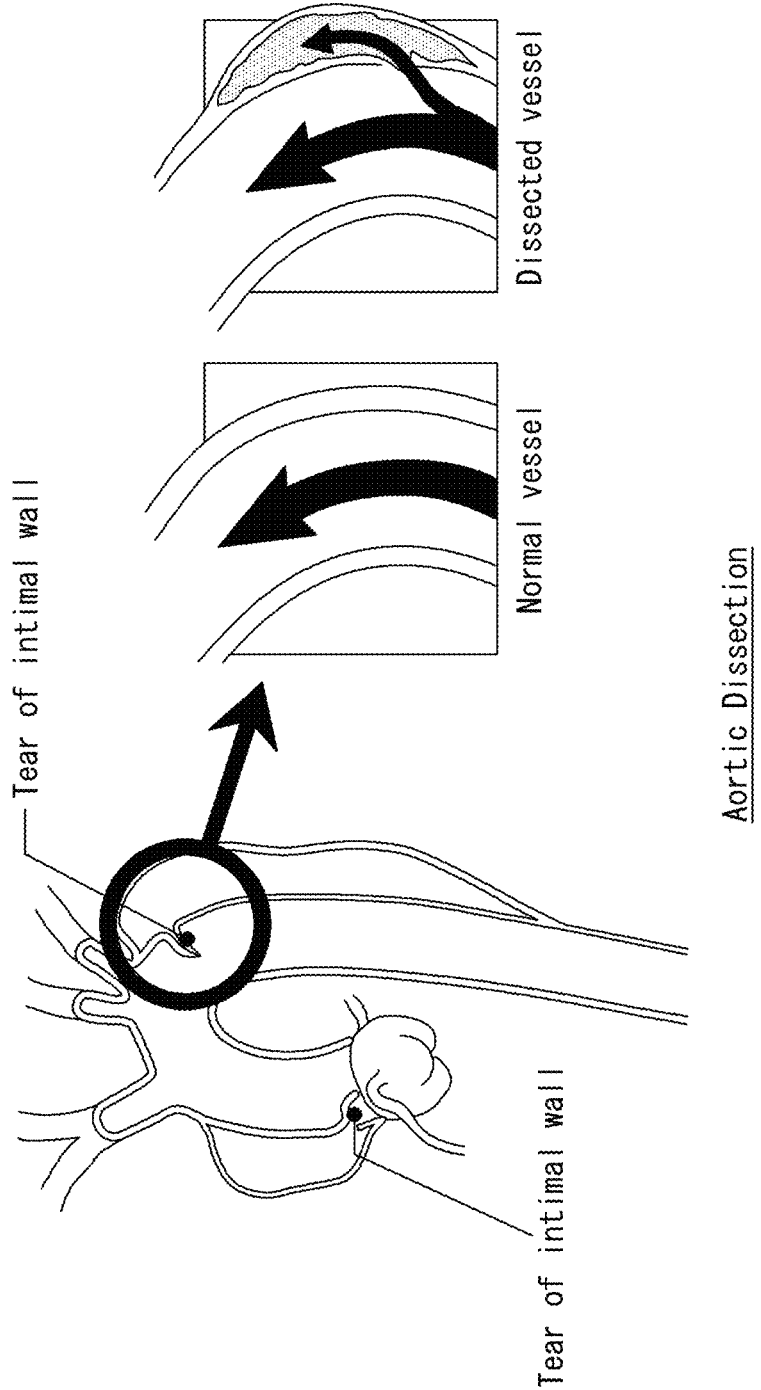
FIG. 7 is a conceptual diagram illustrating a cause of aortic dissection.

FIG. 7 is a conceptual diagram illustrating a cause of aortic dissection.

As an intima in the aorta is damaged, blood flowing only within a lumen in a normal blood vessel flows into the aortic media due to an intimal tear, and the outer wall of the aorta is separated from the intima. Hypertension is known as the representative cause of aortic dissection, and it is known that about 80% of patients with acute aortic dissection have hypertension. Marfan syndrome, which is a hereditary disease, is also a cause of aortic dissection, and it is known that other causes include trauma, aortic constriction, and stratified necrosis. About 90% of patients who experience aortic dissection suddenly feel severe pain similar to a tear in the chest or back. It is known that pain occurs in the chest when aortic dissection occurs in the ascending aorta close to the heart and pain occurs in the back or abdomen when aortic dissection occurs in the descending aorta toward the legs.

Figure 8:
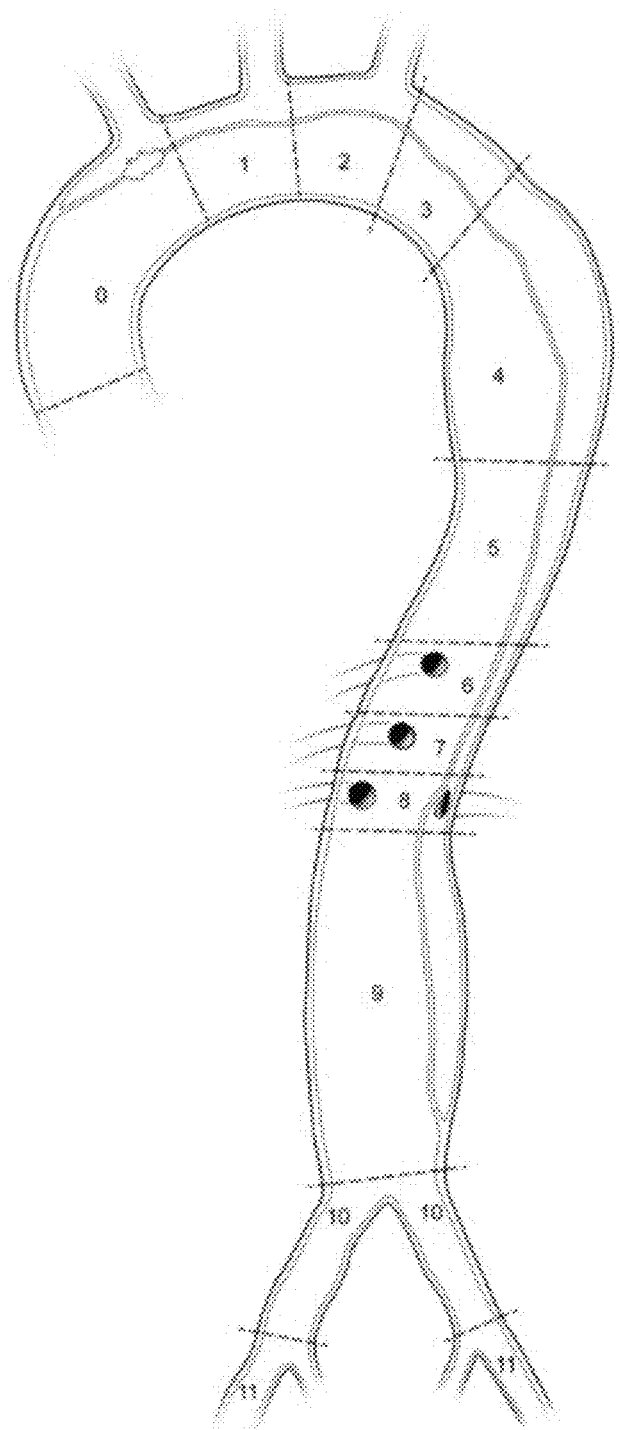
FIG. 8 is a conceptual diagram showing the structure of the thoracic aorta and an example in which the thoracic aorta is divided into a plurality of regions.

FIG. 8 is a conceptual diagram showing the structure of the thoracic aorta and an example in which the thoracic aorta is divided into a plurality of regions.

Referring to FIG. 8, there is shown an example in which the aorta is subdivided into zones 0 to 11. Zone 0 includes the ascending aorta and a portion of the aortic arch, and zones 1 and 2 include the aortic arch. Zones 3 and 4 correspond to the descending aorta, and zone 5 and the zones below zone 5 correspond to the abdominal aorta.

The individual zones of FIG. 8 may be an example of the aortic zones that are divided such that they can be distinguished by the image processing of a medical image or the learning/inference of an artificial neural network. For example, zone 2 is defined as the area between the left carotid artery and the left subclavian artery, and an image processing program or an artificial neural network may perform segmentation into the left carotid artery and the left subclavian artery first and then define the region of the aorta therebetween as zone 2. Segmentation into zones 6 to 8 may be performed in connection with the locations of different blood vessels branching off the abdominal aorta.

Figure 9:
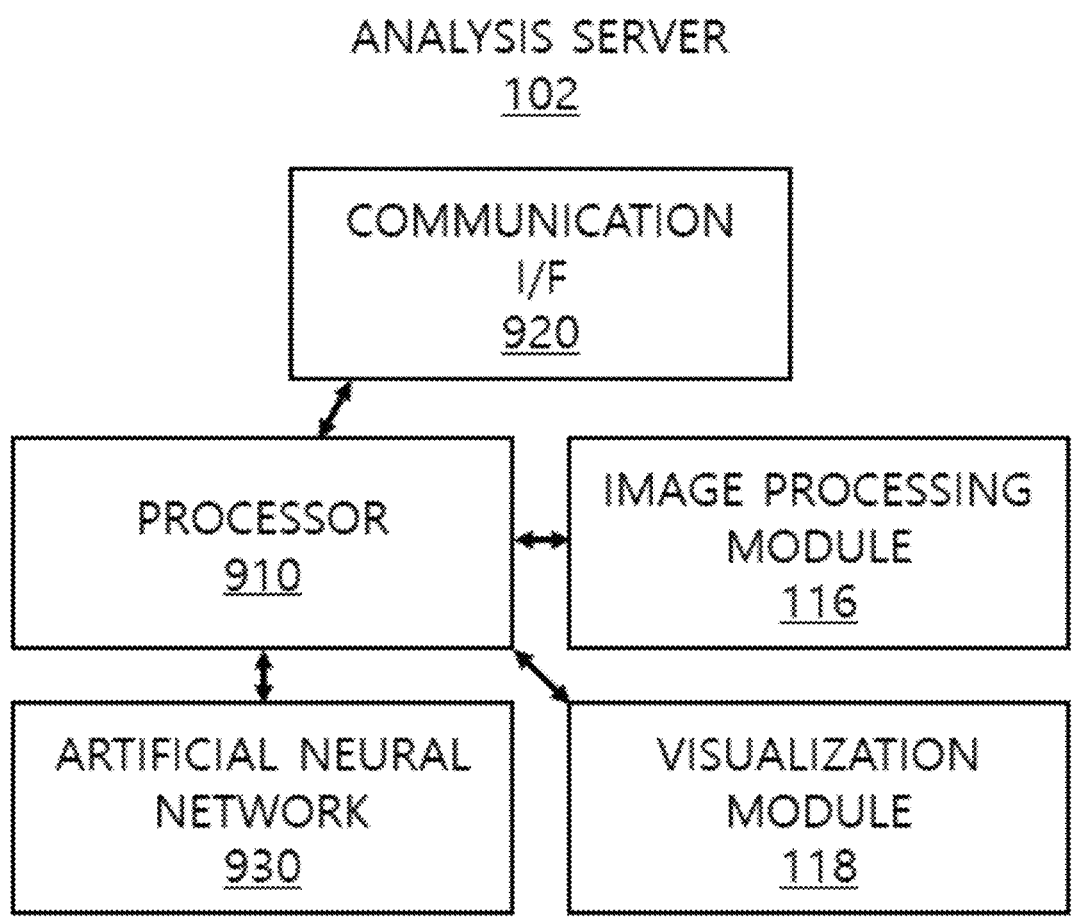
FIG. 9 is a block diagram showing the generalized configuration of the analysis server of FIG. 1, which is an image diagnosis assistance apparatus according to an embodiment of the present invention.

FIG. 9 is a block diagram showing the generalized configuration of the analysis server 102 of FIG. 1, which is an image diagnosis assistance apparatus according to an embodiment of the present invention.

The analysis server 102 may be an embodiment of the medical image diagnosis assistance apparatus of the present invention. The analysis server 102 includes a communication interface 920 configured to receive a medical image from the imaging device 106 or the image database server 108, and at least one processor 910 configured to load and execute an image processing program and/or a visualization program while operating in conjunction with the image processing module 116 and the visualization module 118.

The at least one processor 910 may control at least one artificial neural network 930 to execute a program of the image processing module 116 and/or a program of the visualization module 118, and may output the inference result of the artificial neural network 930 as the execution result of the image processing module 116 and/or the visualization module 118.

Figure 10:
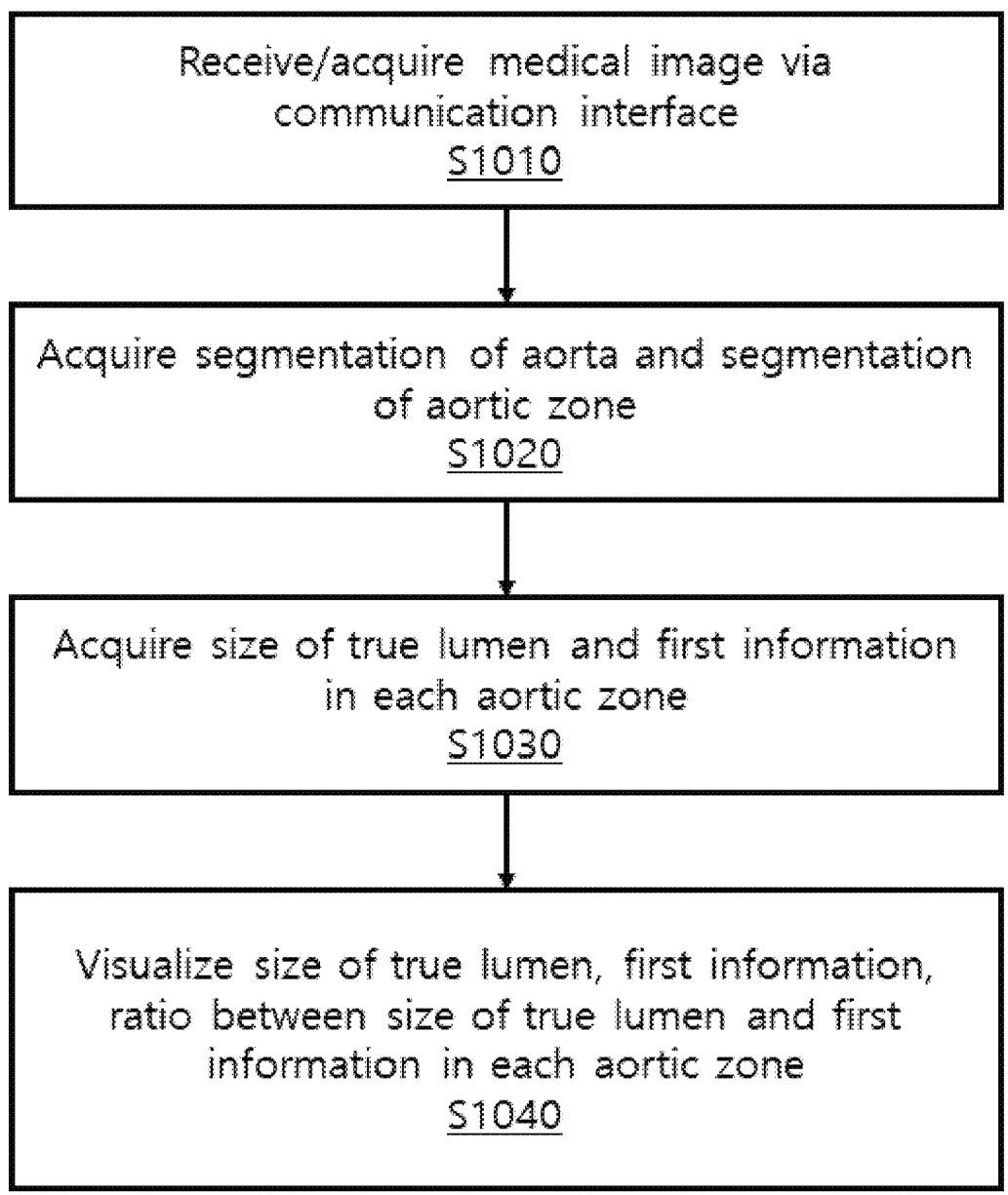
FIG. 10 is an operational flowchart showing a medical image diagnosis assistance method according to an embodiment of the present invention.

FIG. 10 is an operational flowchart showing a medical image diagnosis assistance method according to an embodiment of the present invention.

The medical image diagnosis assistance method according to the embodiment of the present invention may be performed by loading and executing program instructions onto the at least one processor 910 in the computing system including the at least one processor 910.

The medical image diagnosis assistance method may include: receiving, by the at least one processor 910, a medical image acquired for an anatomical structure inside the human body via the communication interface 920 in step S1010; obtaining, by the at least one processor 910, the results of segmentation of the aorta within the medical image and the results of segmentation of a plurality of aortic zones within the aorta in step S1020; obtaining, by the at least one processor 910, the size of a true lumen including the area surrounded by an intima within each of the plurality of aortic zones and first information about each of the plurality of aortic zones based on the obtained/referenced results in step S1030; and generating, by the at least one processor 910, visualization information to be provided to a user through a display by visualizing the size of the true lumen, the first information, and the ratio between the size of the true lumen and the first information in each of the plurality of aortic zones by using visualization segments disposed to correspond to the plurality of respective aortic zones in step S1040.

FIGS. 11 to 15 show an embodiment in which the size of a false lumen including the area between an intima and an adventitia in each of the aortic zones is obtained as first information in order to generate diagnosis assistance information for the diagnosis of an aortic dissection.

Figure 11:
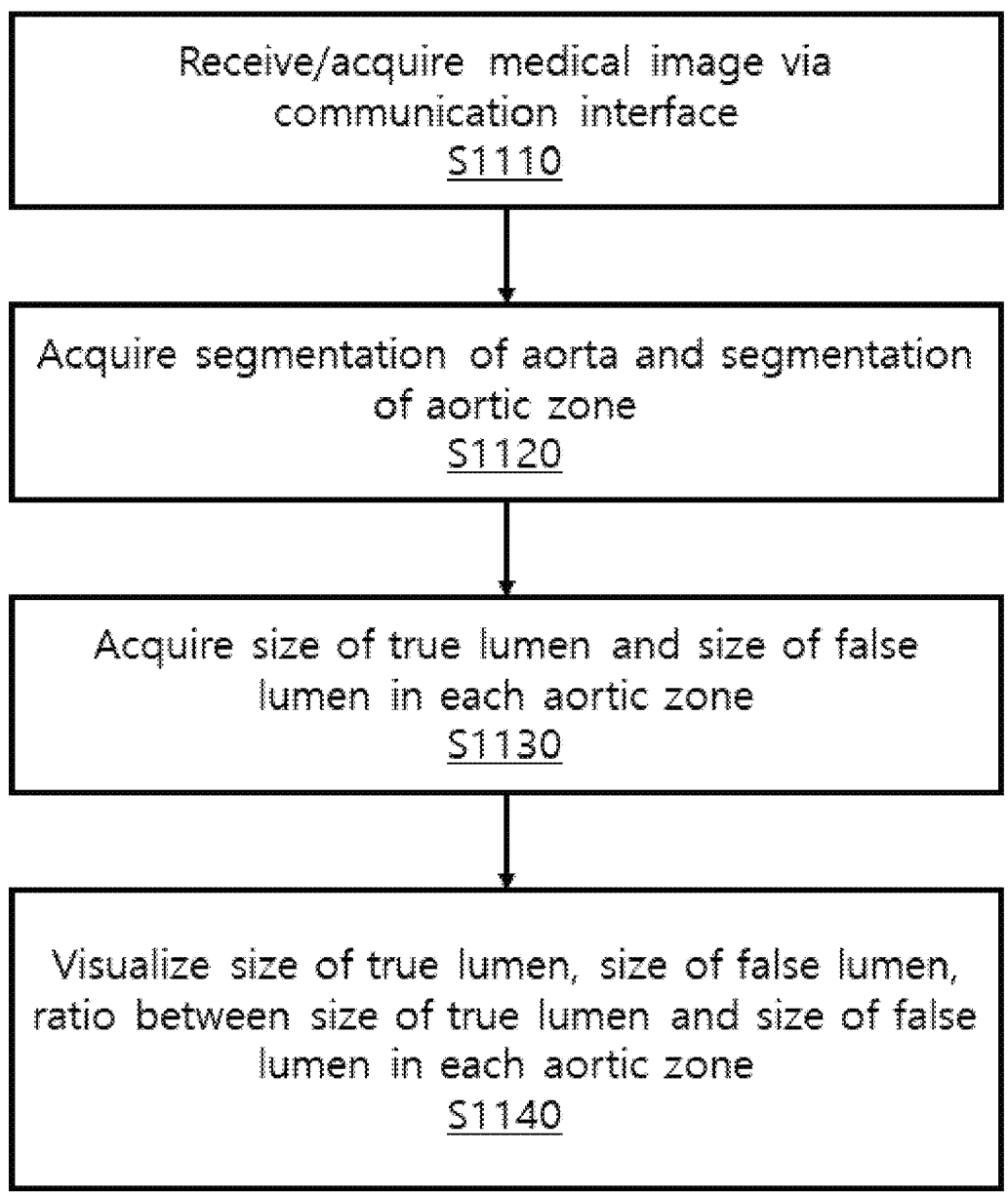
FIG. 11 is an operational flowchart showing a medical image diagnosis assistance method according to an embodiment of the present invention.

FIG. 11 is an operational flowchart showing a medical image diagnosis assistance method according to an embodiment of the present invention.

The medical image diagnosis assistance method according to the embodiment of the present invention may be performed by loading and executing program instructions onto the at least one processor 910 in the computing system including the at least one processor 910. The medical image diagnosis assistance method includes:

receiving, by the at least one processor 910, a medical image including information about an anatomical structure inside the human body via the communication interface 920 in step S1110; obtaining/referring to, by the at least one processor 910, the results of segmentation of the aorta within the medical image and the results of segmentation of a plurality of aortic zones within the aorta in step S1120; obtaining, by the at least one processor 910, the size of a true lumen including the area surrounded by an intima within each of the plurality of aortic zones, and the size of a false lumen including the area between an intima and an adventitia within each of the plurality of aortic zones based on the obtained/referenced results in step S1130; and generating, by the at least one processor 910, visualization information by visualizing the size of the true lumen, the size of the false lumen, and the ratio between the size of the true lumen and the size of the false lumen in each of the plurality of aortic zones by using visualization segments disposed to correspond to the plurality of respective aortic zones in step S1140. In this case, in step S1130, the size of the false lumen may be obtained as first information. The visualization information generated in step S1140 may be generated as diagnosis assistance information for the diagnosis of aortic dissection in each of the plurality of aortic zones.

Figure 12:
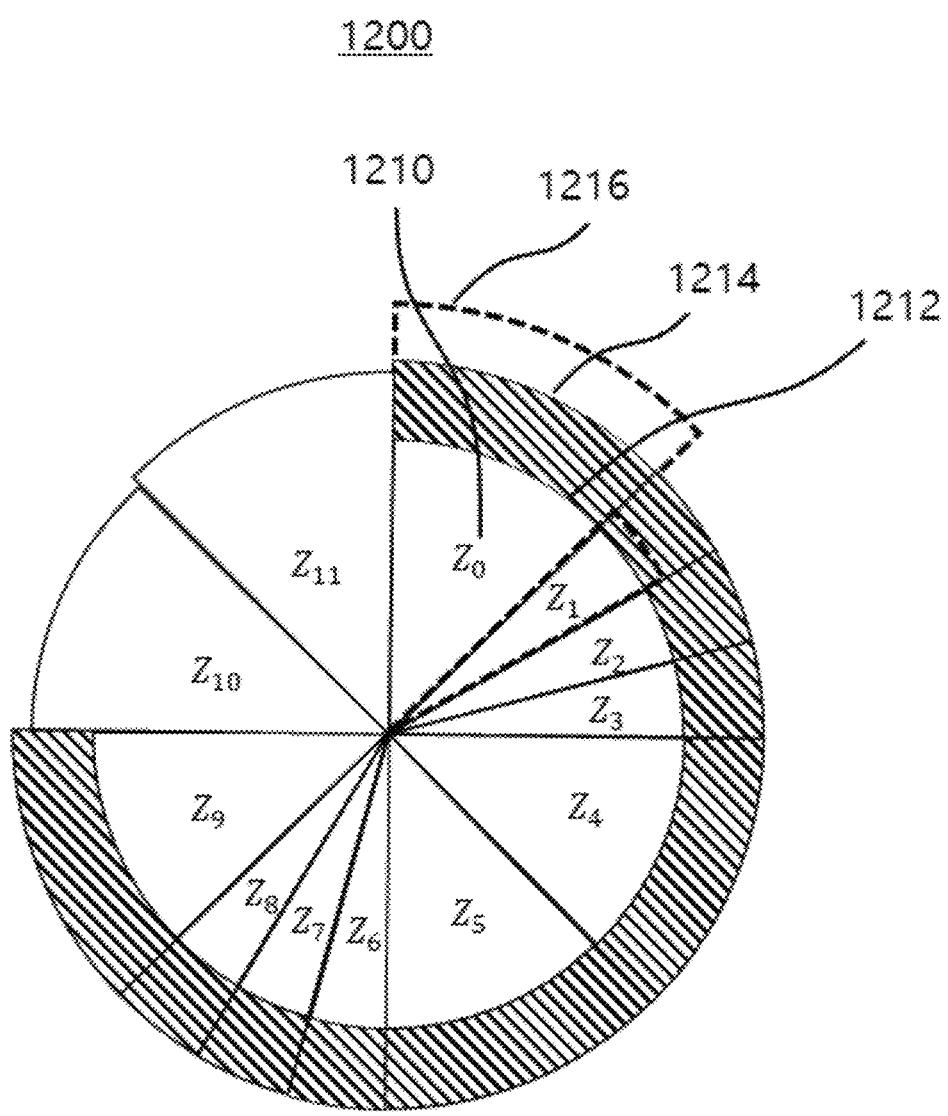
FIG. 12 shows an example of a user interface that visualizes aortic dissection analysis results for a plurality of respective aortic zones according to an embodiment of the present invention.
Figure 13:
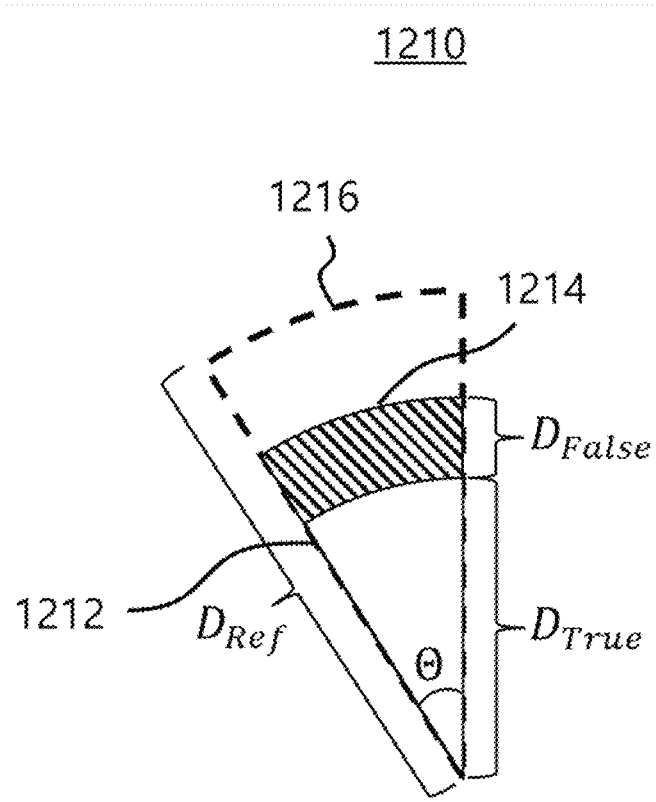
FIG. 13 shows an embodiment of one segment of the visualization graph shown in FIG. 12.
Figure 14:
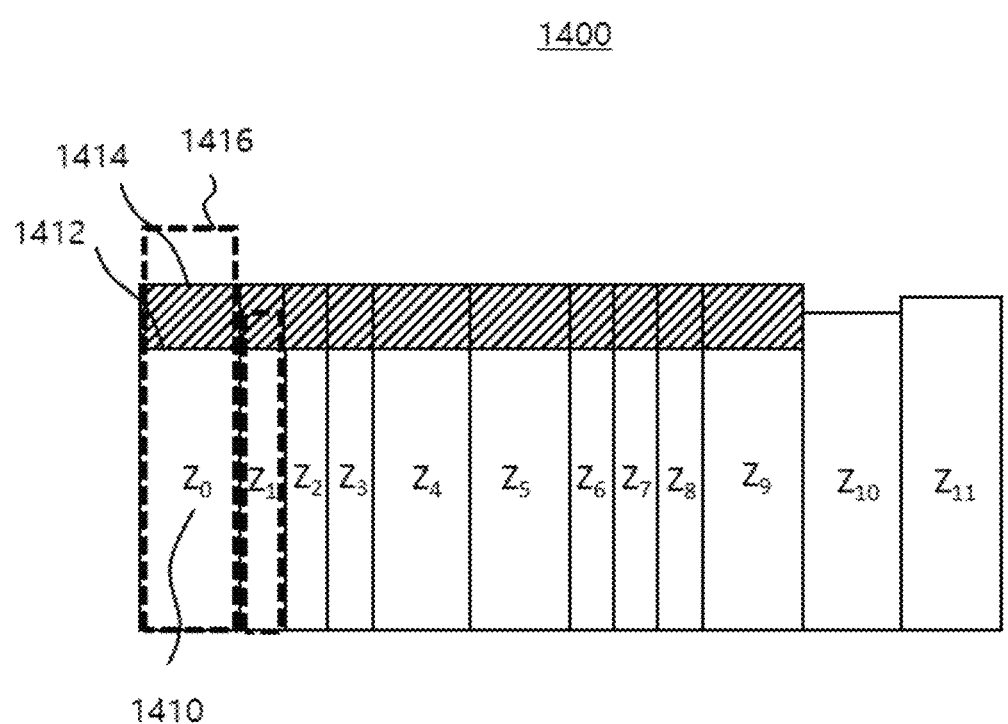
FIG. 14 is an example of a visualization graph of aortic dissection analysis results provided to a user by the medical image diagnosis assistance apparatus according to the embodiment of the present invention.
Figure 15:
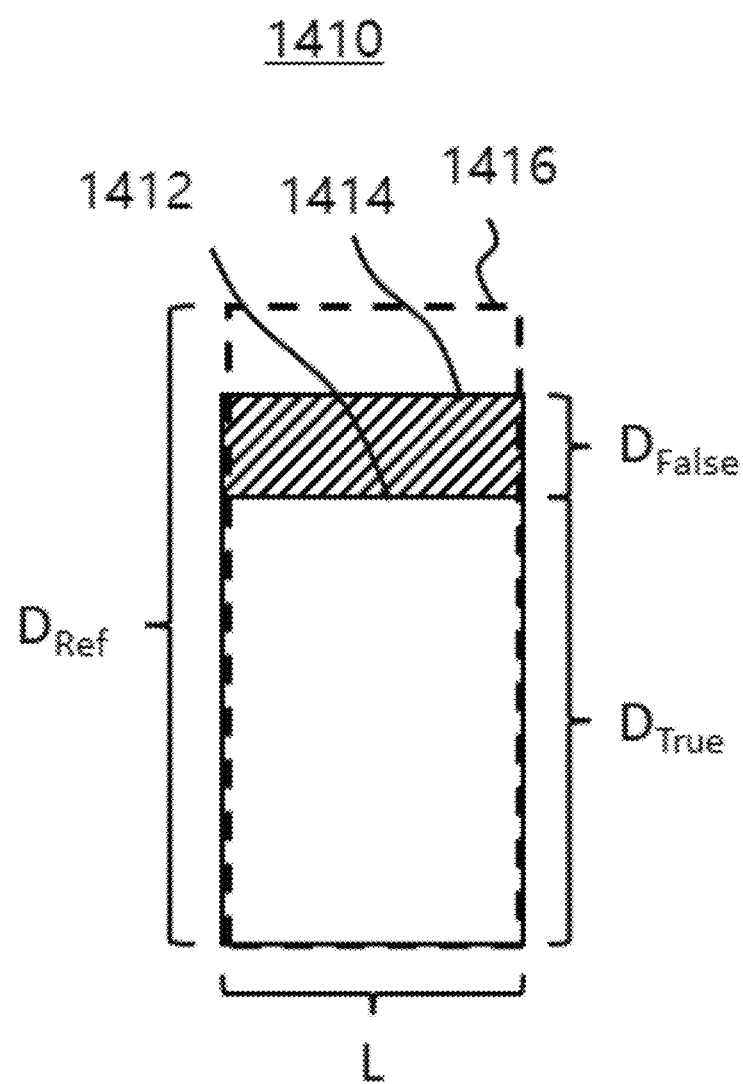
FIG. 15 is an embodiment of one segment of the visualization graph shown in FIG. 14.

In this case, the visualization segments may be visualization segments that share the center point of an imaginary circle and are radially disposed from the center point, as shown in FIGS. 12 and 13. Alternatively, the visualization segments may be visualization segments that share a reference line in a first direction (the horizontal direction) and are disposed in a second direction (the vertical direction) from the reference line, as shown in FIGS. 14 and 15.

The at least one processor 910 may generate visualization information by visualizing each of the plurality of aortic zones so that the plurality of aortic zones correspond to respective visualization segments in a graph. The at least one processor 910 may generate visualization information by visualizing each of the visualization segments so that the visualization segment has a first size corresponding to the ratio between the length of a corresponding aortic zone and the total length of the aorta. The first size may be the central angle of the sector in the embodiment of FIGS. 12 and 13, and may be the length L of the visualization segment in the first direction in the embodiment of FIGS. 14 and 15.

The at least one processor 910 may obtain the size of the aorta of the normal group of an aortic zone corresponding to each of the visualization segments as second information. The at least one processor 910 may generate visualization information by visualizing the second information so that the second information can be compared with the size of the true lumen and the size of the false lumen in the corresponding aortic zone.

The at least one processor 910 may determine the size of the true lumen and the size of the false lumen in each of the plurality of aortic zones in proportion to the length of the diameter.

The at least one processor 910 may determine the size of the true lumen and the size of the false lumen in each of the plurality of aortic zones in proportion to the lengths of the areas onto which the true lumen and the false lumen are projected in any plane on a coronary structure. The any plane may be a plane perpendicular to the coronary structure, but a plane of projection may be determined by taking into consideration the characteristics of the coronary structure.

The at least one processor 910 may generate visualization information by using the second size of the visualization segment that is proportional to the size of the lumen and the size of the false lumen in each of the plurality of aortic zones. The second size may be visualized using the length of the radius of the sector in the embodiment of FIGS. 12 and 13, and may be visualized using the length of the visualization segment in a second direction in the embodiment of FIGS. 14 and 15.

The at least one processor 910 may generate visualization information using the third size of the visualization segment that is proportional to the size of the true lumen and the size of the false lumen in each of the plurality of aortic zones. The third size may be the area or volume of the visualization segment.

According to an embodiment, when the size of the true lumen and the size of the false lumen in each of the plurality of aortic zones are determined in proportion to the length of the diameter, the visualization segment may be visualized using length information that is proportional to the size of the true lumen and the size of the false lumen. For example, the visualization segment may be visualized using the second size.

According to an embodiment, when the size of the true lumen and the size of the false lumen in each of the plurality of aortic zones are determined in proportion to the length of the area, the visualization segment may be visualized using area or volume information that is proportional to the size of the true lumen and the size of the false lumen. For example, the visualization segment may be visualized using a third size.

FIG. 12 shows an example of a user interface that visualizes aortic dissection analysis results (diagnosis assistance information) for a plurality of respective aortic zones according to an embodiment of the present invention.

Referring to FIG. 12, the aortic dissection analysis results (the diagnosis assistance information) for the plurality of respective aortic zones are visualized on the user interface in the form of a similar pie graph.

In general, in a pie graph, a circle is divided into a plurality of visualization segments, all the visualization segments share the center of the circle, and the size of each of the visualization segments is determined in proportion to category information to be visualized. In the most widely used pie graph, the size of each visualization segment may be represented by an arc length. A complete circle is proportional to the category information to be visualized, i.e., the sum of data, the sum of the data is 100%, and the size of each of the visualization segments is determined according to the ratio to the sum of the data.

In the embodiment of FIGS. 12 and 13, there is proposed a similar pie graph including a plurality of visualization segments that share a center point and are radially disposed from the center point like a pie graph. A visualization graph 1200 according to the embodiment of the present invention may not form a perfect circle. The visualization segments 1210 of the visualization graph according to the embodiment of the present invention may correspond to a plurality of respective aortic zones. The sizes of the visualization segments 1210 of the visualization graph 1200 and/or the sizes of sub-segments 1212, 1214 and 1216 may be determined in proportion to the quantified information of aortic dissection measurement results for the plurality of aortic zones.

The visualization graph 1200 shown in FIG. 12 may visualize pathological information about normal blood vessels and dissected regions in a plurality of aortic zones $Z_0$ to $Z_{11}$ corresponding to the structure of the aorta as one graph. The plurality of visualization segments 1210 in the visualization graph 1200 may correspond to the plurality of respective aortic zones $Z_0$ to $Z_{11}$. Each of the plurality of visualization segments 1210 in the visualization graph 1200 may be visualized together with identification information indicative of a relationship with a corresponding one of the aortic zones $Z_0$ to $Z_{11}$. The plurality of visualization segments 1210 in the visualization graph 1200 may be disposed in the visualization graph 1200 based on the locations, sequential arrangement positions, and anatomical structures of the corresponding aortic zones $Z_0$ to $Z_{11}$.

A central angle forming the arc of each of the visualization segments 1210 may be determined by the ratio of the length of an aortic zone corresponding to each of the visualization segments to the total length of the aorta. In other words, the central angle Θ_zone of each of the visualization segments 1210 may be represented by Equation 1 below:

$$\Theta\_zone = (AortaLength\_zone / AortaLength\_total) * 360 \text{ [degree]} \quad (1)$$

In this case, the total length AortaLength_total of the aorta and/or the length AortaLength_zone of each aortic zone may be measured along the central axis of the aorta. The central axis of the aorta may be a line connecting the central points of cross-sections based on the locations of the aorta during the segmentation of the aorta.

FIG. 13 shows an embodiment of one segment 1210 of the visualization graph 1200 shown in FIG. 12.

Referring to FIGS. 12 and 13, the relative size of a dissected false lumen (the diameter of the false lumen—the diameter of a true lumen) is denoted by $D_{False}$, and the size of the true lumen (the diameter of the true lumen) is denoted by $D_{True}$, as in FIG. 3.

At a corresponding location, the total diameter of the aorta, including the regions of both the true and false lumens, is denoted by the total diameter $D_{Whole}$.

The relationship between the total diameter $D_{Whole}$, the diameter $D_{True}$ of the true lumen, and the relative size $D_{False}$ of the false lumen is represented by Equation 2 below:

$$D_{Whole} = D_{True} + D_{False} \quad (2)$$

The diameter of the true lumen and the diameter of the false lumen in each of the visualization segments 1210 of FIG. 12 may be shown in the sequence of the first sub-segment 1212 corresponding to the size of the true lumen area and the second sub-segment 1214 corresponding to the relative size of the false lumen area from the center point, as shown in FIG. 13.

Meanwhile, as shown in FIGS. 12 and 13, in order to assist a clinical diagnosis regarding whether the measured diameter of a true lumen and the measured diameter of a false lumen mean aortic dissection, the diameter $D_{Ref}$ of the normal aorta at the corresponding location may be visualized for each of the visualization segments 1210 together with the first sub-segment 1212 and the second sub-segment 1214 as the radius of the third sub-segment 1216. In this case, the diameter $D_{Ref}$ of the normal aorta may be a reference true lumen, or may be a reference diameter obtained by combining a reference true lumen with a predetermined reference value (a permissible value for the size of the false lumen).

Whether the size of the true lumen and the size of the false lumen at the corresponding location means aortic dissection may be determined by a user who is a medical professional based on the ratio between the size of the true lumen and the size of the false lumen, the absolute value of the size of the false lumen, the size of an area obtained by summing the true lumen and the false lumen, and the ratio between the size of the normal aorta and the size of the summed areas.

It is obvious that the medical image diagnosis assistance apparatus according to the present invention may provide a preliminary inference result regarding whether an aortic dissection has occurred at the corresponding location, obtained by determining whether the size of the true lumen and the size of the false lumen at the corresponding location means aortic dissection based on the ratio between the size of the true lumen and the size of the false lumen, the absolute value of the size of the false lumen, the size of an area obtained by summing the true lumen and the false lumen, and the ratio between the size of the normal aorta and the size of the summed areas, to a user together with the visualization graph 1200 of FIG. 12 or 13 as diagnosis assistance information.

The size information of the true lumen and the size information of the false lumen visualized for each of the plurality of aortic zones $Z_0$ to $Z_{11}$ may be the representative values of the true lumen and the false lumen obtained for each of the plurality of aortic zones $Z_0$ to $Z_{11}$. The representative values may be obtained based on the sizes of the areas of the true lumen and the false lumen identified on the same cross section. In this case, the location where the size of the false lumen is the largest, the location where the size of the false lumen has the largest ratio to the size of the true lumen, or the location where the size of the sum of the sizes of the true lumen and the false lumen has the largest ratio to the size of the normal aorta may be selected as a representative location, and the sizes of and ratio between a true lumen and a false lumen at the representative location may be selected as representative values.

According to another embodiment of the present invention, representative values may be obtained based on the results of statistical processing performed on the sizes of true lumens and false lumens for sections to which the plurality of respective aortic zones $Z_0$ to $Z_{11}$ belong. The statistical processing may be performed through techniques such as arithmetic mean, harmonic mean, geometric mean, weighted mean, maximum value, minimum value, and median value techniques.

Referring to FIGS. 1, and 9 to 13, the analysis server 102 is the medical image diagnosis assistance apparatus according to the embodiment of the present invention, and includes the computing system. The computing system includes: the communication interface 920 configured to receive a medical image including information about an anatomical structure inside the human body; and the at least one processor 910 configured to obtain the size of a true lumen including the area surrounded by an intima in each of a plurality of aortic zones, and the size of a false lumen including an area between an intima and an adventitia in each of the plurality of aortic zones based on the results of segmentation of the aorta within the medical image and the results of segmentation of the plurality of aortic zones within the aorta. The at least one processor 910 generates visualization information by visualizing the size of the true lumen, the size of the false lumen, and the ratio between the size of the true lumen and the size of the false lumen within each of the plurality of aortic zones by using a graph including visualization segments that correspond to a plurality of respective aortic zones, share the center point of an imaginary circle and are radially disposed from the center point.

The results of segmentation of the aorta within the medical image and the results of segmentation of the plurality of aortic zones within the aorta may be obtained by loading and executing a program of the image processing module 116 into the processor 910. Alternatively, the results of segmentation of the aorta within the medical image and the results of segmentation of the plurality of aortic zones within the aorta may be obtained in such a manner that results inferred by the artificial neural network 930 under the control of the processor 910 are provided as the analysis results of the image processing module 116. At least some of the results of segmentation of the aorta within the medical image and the results of segmentation of the plurality of aortic zones within the aorta may be received via the network 114 and the communication interface 920 in such a manner that the analysis server 102 requests the at least some results from the computer-aided diagnosis server 112.

The size of the true lumen, the size of the false lumen, and the ratio between the size of the true lumen and the size of the false lumen in each of the plurality of aortic zones may be obtained by loading and executing a program of the visualization module 118 onto the processor 910. Alternatively, the results of segmentation of the aorta within the medical image and the results of segmentation of the plurality of aortic zones within the aorta may be obtained in such a manner that results inferred by the artificial neural network 930 under the control of the processor 910 are provided as the analysis results of the visualization module 118.

The visualization information may be visualized through the analysis server 102 or the user interface 120 included in the client device 104 and then provided to a user.

The at least one processor 910 may generate visualization information by visualizing each of a plurality of aortic zones so that the plurality of aortic zones correspond to respective visualization segments in a graph. The at least one processor 910 may generate visualization information by visualizing each of the visualization segments so that the visualization segment has a central angle corresponding to the ratio between the length of a corresponding aortic zone and the total length of the aorta.

The at least one processor 910 may generate visualization information by visualizing each of the visualization segments so that the size of the aorta of the normal group of a corresponding aortic zone can be compared with the size of the true lumen and the size of the false lumen in the corresponding aortic zone.

In the embodiment of FIGS. 12 and 13, the at least one processor 910 may determine the size of a true lumen and the size of a false lumen in each of a plurality of aortic zones in proportion to the length of the diameter. In the embodiment of FIGS. 12 and 13, the at least one processor 910 may generate visualization information by visualizing the size of a true lumen and the size of a false lumen in each of a plurality of aortic zones in proportion to the radius of a visualization segment.

In another embodiment of the present invention, the at least one processor 910 may determine the size of a true lumen and the size of a false lumen in each of a plurality of aortic zones in proportion to the area of the true lumen and the area of the false lumen. In another embodiment of the present invention, the at least one processor 910 may generate visualization information by visualizing the size of a true lumen and the size of a false lumen in each of a plurality of aortic zones in proportion to the area of a visualization segment.

The visualization information may be provided to a user via the user interface 120. The user interface 120 may be included in the client device 104 and interact with a user, and may be included in an integrated medical image diagnosis assistance apparatus (not shown) including all the functions of the analysis server 102 and the client device 104 and provide the visualization information to the user.

A report having additional information generated based on an analysis result obtained by the image processing module 116 executed by the processor 910 or the computer-aided diagnostic server 112 may be generated and provided to a user via the user interface 120 together with visualization information.

The report may include quantitative measurement information about each of the plurality of aortic zones of the aorta and information about the segmentation and/or boundary detection of a true lumen and a false lumen detected in each of the plurality of aortic zone as additional information. The report may include the result of inference of whether an aortic dissection has occurred in each of the plurality of aortic zones as additional information. The report may include, as additional information, a link to a reference image in which true and false lumens are distinguished and visualized on a cross-sectional image of the aorta so that a user can once again observe the visualized true and false lumens for each of the plurality of aortic zones. The report may include, as additional information, a link to a reference image that visualizes a preprocessing process involved in the segmentation and/or identification of true and false lumens so that a user can verify that the true and false lumens have been appropriately segmented and/or identified for each of the plurality of aortic zones.

FIG. 14 is an example of a visualization graph 1400 of aortic dissection analysis results provided to a user by the medical image diagnosis assistance apparatus according to the embodiment of the present invention.

FIG. 15 is an embodiment of one segment 1410 of the visualization graph 1400 shown in FIG. 14.

In FIG. 14, there may be visualized pathological information about normal blood vessels and dissected regions in the plurality of aortic zones $Z_0$ to $Z_{11}$.

The visualization segments 1410 of FIG. 14 correspond to the plurality of respective aortic zones $Z_0$ to $Z_{11}$. Referring to FIGS. 14 and 15 together, each of the visualization segments 1410 may be visualized together with the first sub-segment 1412 having a size corresponding to the diameter $D_{True}$ of a true lumen in each of the plurality of aortic zones $Z_0$ to $Z_{11}$, the second sub-segment 1414 having a size corresponding to the relative size $D_{False}$ of a dissected false lumen (the difference between the diameter of the false lumen and the diameter of the true lumen), and the third sub-segment 1416 having a size corresponding to the diameter $D_{Ref}$ of the normal aorta at a corresponding location when anatomical information is taken into consideration.

Each of the visualization segments 1410 may be visualized together with identification information indicating a relationship with a corresponding one of the plurality of aortic zones $Z_0$ to $Z_{11}$. The visualization segments 1410 may be arranged in the visualization graph 1400 based on the characteristics, locations, and sequential positions of the anatomical structures of the plurality of aortic zones $Z_0$ to $Z_{11}$.

In the embodiment of FIGS. 14 and 15, whether the size of the true lumen and the size of the false lumen at the corresponding location means aortic dissection may be determined by a user who is a medical professional based on the ratio between the size of the true lumen and the size of the false lumen, the absolute value of the size of the false lumen, the size of an area obtained by summing the true lumen and the false lumen, and the ratio between the size of the normal aorta and the size of the summed areas, as in the embodiment of FIGS. 12 and 13.

The medical image diagnosis assistance apparatus according to the present invention may provide a preliminary inference result regarding whether an aortic dissection has occurred at the corresponding location, obtained by determining whether the size of the true lumen and the size of the false lumen at the corresponding location means aortic dissection based on the ratio between the size of the true lumen and the size of the false lumen, the absolute value of the size of the false lumen, the size of an area obtained by summing the true lumen and the false lumen, and the ratio between the size of the normal aorta and the size of the summed areas, to a user together with the visualization graph of FIGS. 14 and/or 15 as diagnosis assistance information.

An embodiment in which the size of a reference true lumen, which is the size of the aortic zone in a normal group, is obtained as a first size in each of a plurality of aortic zones in order to generate diagnosis assistance information for the diagnosis of an aortic aneurysm is shown in FIGS. 16 to 20.

Figure 16:
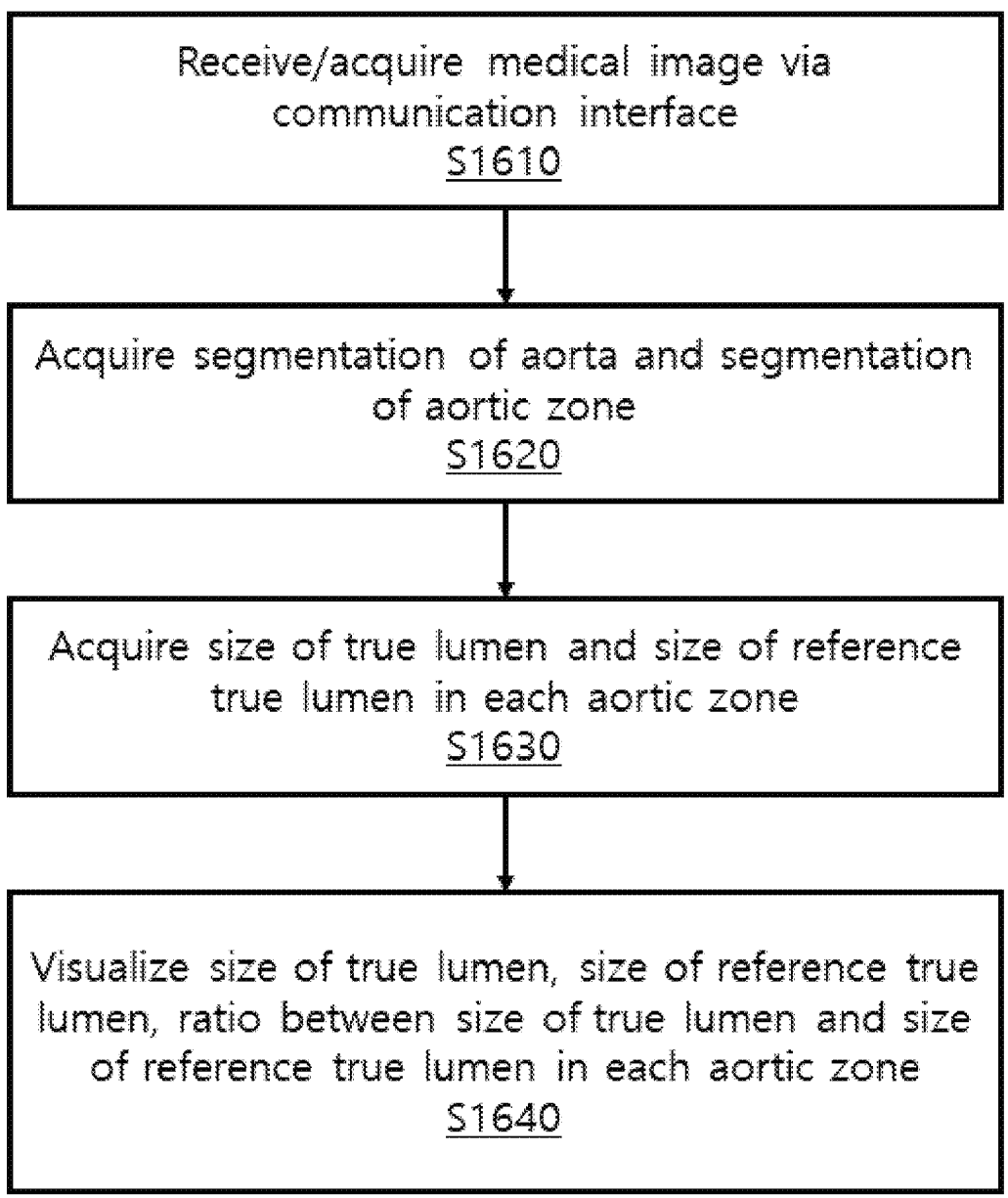
FIG. 16 is an operational flowchart showing a medical image diagnosis assistance method according to an embodiment of the present invention.

FIG. 16 is an operational flowchart showing a medical image diagnosis assistance method according to an embodiment of the present invention.

The medical image diagnosis assistance method according to the embodiment of the present invention may be performed by loading and executing program instructions onto the at least one processor 910 in the computing system including the at least one processor 910

The medical image diagnosis assistance method includes: receiving, by the at least one processor 910, a medical image including information about an anatomical structure inside the human body through the communication interface 920 in step S1610; obtaining/referring to, by the at least one processor 910, the results of segmentation of the aorta within the medical image and the results of segmentation of a plurality of aortic zones within the aorta in step S1620; obtaining, by the at least one processor 910, the size of a true lumen including the area surrounded by an intima within each of the plurality of aortic zones and the size of a reference true lumen corresponding to the size of the aorta of a normal group for each of the plurality of aortic zones based on the obtained/referenced results in step S1630; and generating, by the at least one processor 910, visualization information by visualizing the size of the true lumen, the size of the reference true lumen, and the ratio between the size of the true lumen and the size of the reference true lumen in each of the plurality of aortic zones by using visualization segments disposed to correspond to the plurality of respective aortic zones in step S1640. In this case, in step S1630, the size of the reference true lumen may be obtained as first information. The visualization information generated in step S1640 may be generated as diagnosis assistance information for the diagnosis of an aortic aneurysm in each of the plurality of aortic zones.

Figure 17:
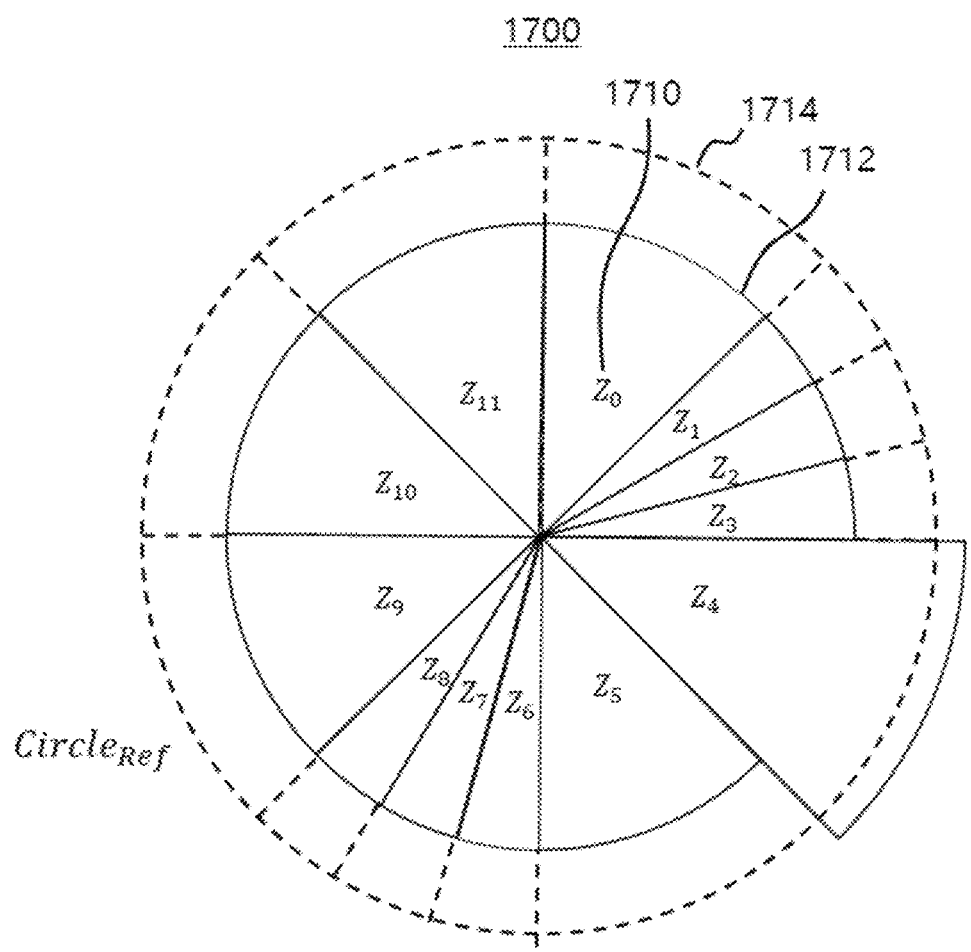
FIG. 17 shows an example of a user interface that visualizes aortic dissection analysis results for a plurality of respective aortic zones according to an embodiment of the present invention.
Figure 18:
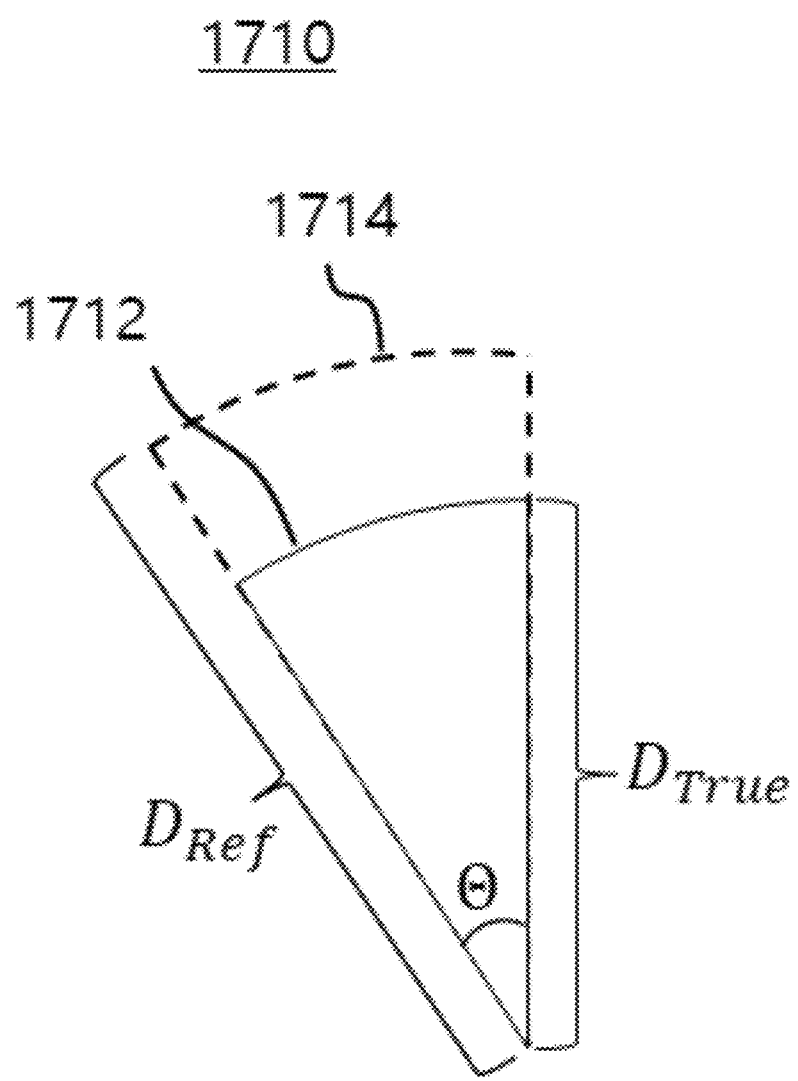
FIG. 18 shows an embodiment of the one segment of the visualization graph 1700 shown in FIG. 17.
Figure 19:
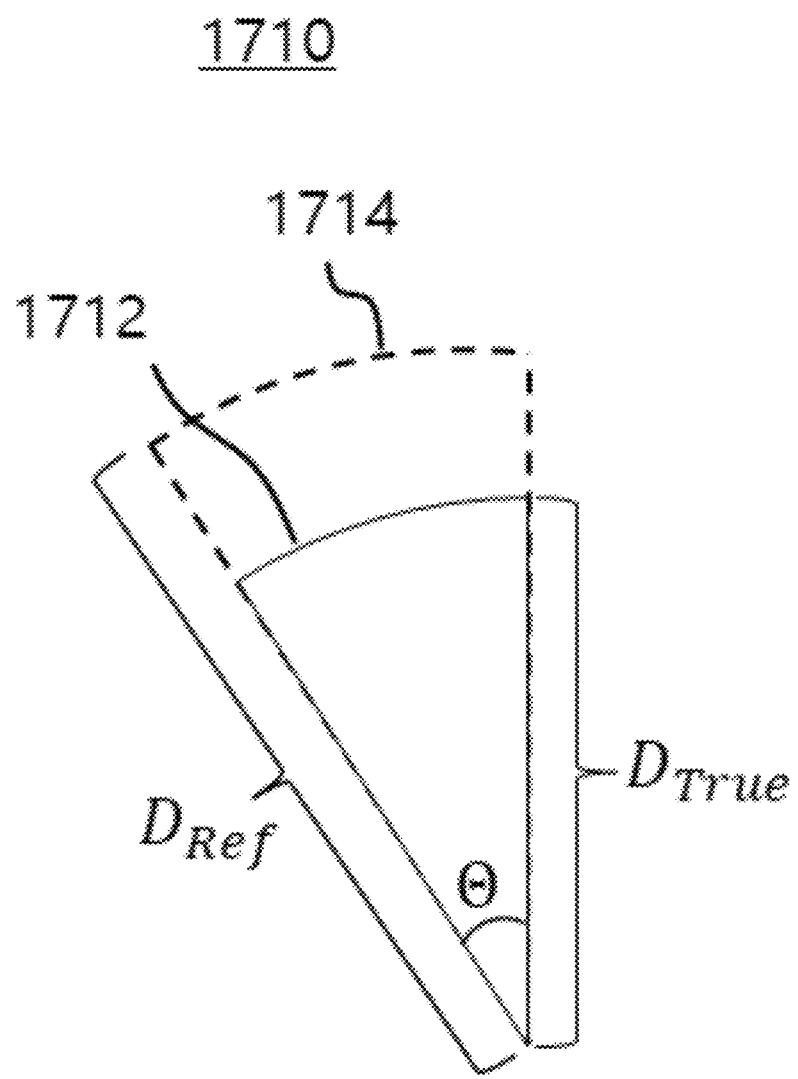
FIG. 19 shows an example of a visualization graph of aortic dissection analysis results that is provided to a user by the medical image diagnosis assistance apparatus according to the embodiment of the present invention.
Figure 20:
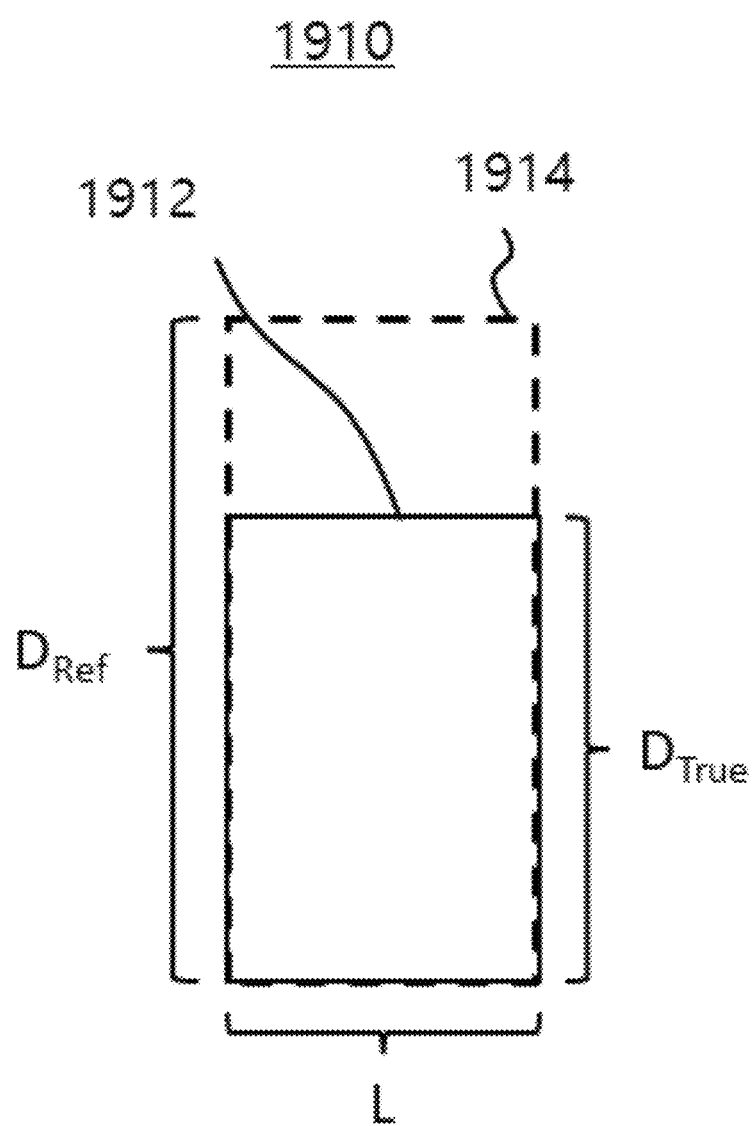
FIG. 20 is an embodiment of the one segment of the visualization graph shown in FIG. 19.

In this case, the visualization segments may be visualization segments that share the center point of an imaginary circle and are radially disposed from the center point, as shown in FIGS. 17 and 18. The visualization segments may be visualization segments that share a reference line in a first direction (the horizontal direction) and are disposed in a second direction (the vertical direction) from the reference line, as shown in FIGS. 19 and 20.

The at least one processor 910 may generate visualization information by visualizing each of a plurality of aortic zones so that the plurality of aortic zones correspond to respective visualization segments in a graph. The at least one processor 910 may generate visualization information by visualizing each of the visualization segments so that the visualization segment has a first size corresponding to the ratio between the length of a corresponding aortic zone and the total length of the aorta. The first size may be the central angle of the sector in the embodiment of FIGS. 17 and 18, and may be the length L of the visualization segment in the first direction in the embodiment of FIGS. 19 and 20.

The at least one processor 910 may generate visualization information for each of the visualization segments by using the second size of the visualization segment that is proportional to the size of a true lumen and the size of a reference true lumen in each of the plurality of aortic zones. The second size may be visualized using the length of the radius of the sector in the embodiment of FIGS. 17 and 18, and may be visualized using the length of the visualization segment in the second direction in the embodiment of FIGS. 19 and 20.

FIG. 17 shows an example of a user interface that visualizes aortic dissection analysis results (diagnosis assistance information) for a plurality of respective aortic zones according to an embodiment of the present invention.

Referring to FIG. 17, the aortic dissection analysis results (the diagnosis assistance information) for the plurality of respective aortic zones are visualized on the user interface in the form of a similar pie graph. In this case, an imaginary circle $Circle_{Ref}$ in which the size of a reference true lumen is normalized and the normalized size of the reference true lumen is the radius may be included in a visualization graph 1700. In this case, the size of reference true lumen may be normalized, and the imaginary circle $Circle_{Ref}$ whose radius is the normalized size of the reference true lumen may be included in the visualization graph 1700.

Although an embodiment in which the size of a true lumen is normalized and visualized based on the size of a reference true lumen in FIGS. 17 and 18, the size of a reference true lumen and the size of a true lumen may be adjusted and visualized for each of a plurality of aortic zones in another embodiment of the present invention. In other words, in another embodiment of the present invention, an imaginary circle according to the normalized size of a reference true lumen may not be formed.

The visualization segments 1710 of a visualization graph according to an embodiment of the present invention may correspond to a plurality of respective aortic zones. The sizes of the visualization segments 1710 of the visualization graph 1700 and/or the sizes of sub-segments 1712 and 1714 may be determined in proportion to the quantified information of aortic dissection measurement results for a plurality of aortic zones.

The visualization graph 1700 shown in FIG. 17 may visualize pathological information about normal blood vessels and dissected regions in a plurality of aortic zones $Z_0$ to $Z_{11}$ corresponding to the structure of the aorta as one graph. Each of the plurality of visualization segments 1710 in the visualization graph 1700 may correspond to a corresponding one of the aortic zones $Z_0$ to $Z_{11}$. Each of the plurality of visualization segments 1710 in the visualization graph 1700 may be visualized together with identification information indicating a relationship with a corresponding one of the aortic zones $Z_0$ to $Z_{11}$. The plurality of visualization segments 1710 in the visualization graph 1700 may be disposed in the visualization graph 1700 based on the locations, sequential arrangement positions, and anatomical structures of the corresponding aortic zones $Z_0$ to $Z_{11}$.

FIG. 18 shows an embodiment of the one segment 1710 of the visualization graph 1700 shown in FIG. 17.

The diameter $D_{True}$ of a true lumen and the size $D_{Ref}$ of a reference true lumen in each of the visualization segments 1710 of FIG. 17 may be visualized by overlaying the first sub-segment 1712 corresponding to the size of the true lumen region from the center point and the second sub-segment 1714 corresponding to the size of the reference true lumen on each other, as shown in FIG. 18. At least one of the first sub-segment 1712 and the second sub-segment 1714 may be set to a semi-transparent state and visualized such that sizes thereof can be compared with each other.

Whether the size of the true lumen and the size of the reference true lumen at the corresponding location means aortic dissection may be determined by a user who is a medical professional based on the ratio between the size of the true lumen and the size of the reference true lumen, the absolute value of the size of the true lumen, and/or the like.

The medical image diagnosis assistance apparatus according to the present invention may provide a preliminary inference result regarding whether an aortic dissection has occurred at the corresponding location, obtained by determining whether the size of the true lumen and the size of the reference true lumen at the corresponding location means aortic dissection based on the ratio between the size of the true lumen and the size of the reference true lumen, the absolute value of the size of the true lumen, and/or the like, to a user together with the visualization graph 1700 of FIGS. 17 and/or 18 as diagnosis assistance information.

FIG. 19 shows an example of a visualization graph 1900 of aortic dissection analysis results that is provided to a user by the medical image diagnosis assistance apparatus according to the embodiment of the present invention.

FIG. 20 is an embodiment of the one segment 1910 of the visualization graph 1900 shown in FIG. 19.

In FIG. 19, there may be visualized pathological information about normal blood vessels and dissected regions in the plurality of aortic zones $Z_0$ to $Z_{11}$.

The visualization segments 1910 of FIG. 19 correspond to the plurality of respective aortic zones $Z_0$ to $Z_{11}$. Referring to FIGS. 19 and 20 together, each of the visualization segments 1910 may be visualized to include a first sub-segment 1912 having a size corresponding to the diameter $D_{True}$ of a true lumen in each of the plurality of aortic zones $Z_0$ to $Z_{11}$ and a second sub-segment 1914 having a size corresponding to the size $D_{Ref}$ of a reference true lumen. The first sub-segment 1912 and the second sub-segment 1914 may be overlaid on each other and visualized. At least one of the first sub-segment 1912 and the second sub-segment 1914 may be set to a semi-transparent state and visualized such that the sizes thereof can be compared with each other.

Each of the visualization segments 1910 may be visualized together with identification information indicating a relationship with a corresponding one of the corresponding plurality of aortic zones $Z_0$ to $Z_{11}$. The visualization segments 1910 may be disposed on the visualization graph 1900 based on the characteristics, locations, and sequential positions of the anatomical structures of the plurality of aortic zones $Z_0$ to $Z_{11}$.

In the embodiment of FIGS. 19 and 20, whether the size of the true lumen and the size of the reference true lumen at the corresponding location means aortic dissection may be determined by a user who is a medical professional based on the ratio between the size of a true lumen and the size of the reference true lumen, the absolute value of the size of the true lumen, and/or the like.

The medical image diagnosis assistance apparatus according to the present invention may provide a preliminary inference result regarding whether an aortic dissection has occurred at the corresponding location, obtained by determining whether the size of the true lumen and the size of the reference true lumen at the corresponding location means aortic dissection based on the ratio between the size of the true lumen and the size of the reference true lumen, the absolute value of the size of the true lumen, and/or the like, to a user together with the visualization graph 1900 of FIG. 19 or 20 as diagnosis assistance information.

Although the concept of the present invention has been illustrated through the plurality of embodiments above, the spirit of the present invention is not limited to the limited embodiments. For example, a means such as a treemap may be presented as an embodiment of the present invention. As a hierarchical structure included in the treemap, a first layer may correspond to the size of each aortic zone, a second layer may correspond to the size of a true lumen therein, first information (the size of a false lumen or the size of a reference true lumen), and/or the ratio between the size of the true lumen and the first information, and the size of the normal aorta at a corresponding location may also be visualized using a separate visualization element.

Various types of visualization means using a plurality of visualization segments may be used as an embodiment of the present invention. The relative size of each visualization segment may be visualized to correspond to the relative size of each of the aortic zones (the length of the aorta relative to the total length of the aorta). When the visualization segment has a hierarchical structure or a plurality of sub-segments, the hierarchical structure or the sub-segments may be visualized to correspond to the size of a true lumen within each of a plurality of aortic zones, first information (the size of a false lumen, or the size of a reference true lumen), and/or the ratio between the size of the true lumen and the first information.

In order to easily assist the diagnosis of a medical professional who is a user, the size of the normal aorta in consideration of the anatomical location of each aortic zone may be visualized such that it can be compared with an actual true lumen and/or first information (the size of a false lumen or the size of a reference true lumen).

Referring to the embodiments of FIGS. 1 and 9 to 20, in the medical image diagnosis assistance method performed in a computing system according to an embodiment of the present invention, a predetermined threshold may be applied to the ratio between the size of a true lumen and first information in each of a plurality of aortic zones, and a visualization element configured to highlight an aortic zone requiring attention may be added. When the first information is the size of a false lumen, a risk estimate for an aortic dissection may be determined based on whether the absolute value of the first information exceeds a threshold, whether the ratio of the first information to the true lumen exceeds a threshold, or whether the ratio of the first information to the size of summed lumens (the size of the true lumen+the size of the false lumen) exceeds a threshold, and a visualization element configured to highlight a corresponding aortic zone may be added. When the first information is the size of a reference true lumen, a risk estimate for an aortic aneurysm may be determined based on whether the absolute value of the size of the true lumen exceeds a threshold or whether the ratio of the size of the true lumen to the first information exceeds a threshold, a visualization element configured to highlight a corresponding aortic zone may be added.

According to the present invention, there may be provided a user interface that assists the diagnosis of a user so that the user can easily make a diagnosis based on the results of detection and/or analysis of the pathological information of the aorta, including an aortic aneurysm and/or an aortic dissection, based on artificial intelligence/an artificial neural network.

According to the present invention, there may be provided an intuitive visualization method that effectively assists a user in diagnosing the pathological information of the aorta including an aortic aneurysm and/or an aortic dissection.

According to the present invention, there may be provided an intuitive user interface that enables a user to check whether aortic disease including an aortic aneurysm and/or an aortic dissection has occurred with respect to the detailed structure information of the aorta in an integrated manner.

Even for a user who is a medical professional, the time and accuracy regarding reaching a diagnosis or a decision based on image analysis results overlaid on a medical image, pathological information, or medical findings may vary depending on the proficiency of an individual operator.

Furthermore, since the degree of urgency and a treatment method vary depending on the location on the aorta where an aortic aneurysm or an aortic dissection is detected, there is required a visualization user interface that may provide intuitive notification of the location where an aortic aneurysm or an aortic dissection is detected in the overall structure of the aorta.

According to the present invention, there may be provided a user interface that visualizes the location where an aortic aneurysm or an aortic dissection has occurred in the overall structure of the aorta in an intuitive manner.

According to the present invention, there may be provided a user interface that visualizes the location where an aortic aneurysm or an aortic dissection has occurred in the overall structure of the aorta in an intuitive manner and also assists the diagnosis of a user in order to allow the user to rapidly select a treatment method.

The operation of the method according to an embodiment of the present invention may be implemented as a computer-readable program or code on computer-readable recording media. Computer-readable recording media include all types of recording devices in which information readable by a computer system is stored. The computer-readable recording media may also be distributed in a network-connected computer system to store and execute computer-readable programs or codes in a distributed manner.

The computer-readable recording medium may also include a hardware device specially configured to store and execute program instructions, such as a read only memory (ROM), a random access memory (RAM), and a flash memory. The program instructions may include not only machine language codes such as those generated by a compiler, but also high-level language codes that executable by a computer using an interpreter or the like.

Although some aspects of the present invention have been described in the context of an apparatus, it may also represent a description according to a corresponding method, wherein a block or apparatus corresponds to a method step or feature of a method step. Similarly, aspects described in the context of a method may also represent a corresponding block or item or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

In embodiments, a programmable logic device (e.g., a field programmable gate array) may be used to perform some or all of the functions of the methods described herein. In embodiments, a field-programmable gate array may operate in conjunction with a microprocessor to perform one of the methods described herein. In general, the methods are preferably performed by some hardware device.

Although described above with reference to the preferred embodiments of the present invention, it should be understood that those skilled in the art can variously modify and change the present invention within the scope without departing from the spirit and scope of the present invention as set forth in the claims below.

What is claimed is:

1. A medical image diagnosis assistance apparatus for assisting a diagnosis of a medical image, the medical image diagnosis assistance apparatus comprising a computing system, wherein the computing system comprises:
   a communication interface configured to receive a medical image acquired for an anatomical structure inside a human body; and
   at least one processor, wherein the at least one processor is configured to:
      obtain a size of a first lumen including an area surrounded by an intima in each of a plurality of aortic zones and first information for each of the plurality of aortic zones based on results of segmentation of an aorta in the medical image and results of segmentation of the plurality of aortic zones within the aorta segmented along with a total length of the aorta; and
      visualize the size of the first lumen based on a size of a first visualization representation in each of the plurality of aortic zones; and
      visualize the first information based on a size of a second visualization representation in each of the plurality of aortic zones,
      wherein a ratio between the size of the first lumen and the first information is visualized based on a ratio between the size of the first visualization representation and the size of the second visualization representation in each of the plurality of aortic zones.

2. The medical image diagnosis assistance apparatus of claim 1, wherein the at least one processor is further configured to obtain a size of a first reference lumen corresponding to a size of a normal aorta of each of the plurality of aortic zones as the first information for each of the plurality of aortic zones.

3. The medical image diagnosis assistance apparatus of claim 2, wherein the at least one processor is further configured to:
   generate the first visualization representation visualizing the size of the first lumen in each of the plurality of aortic zones;
   generate the second visualization representation visualizing the size of the first reference lumen in each of the plurality of aortic zones, wherein a ratio between the size of the first lumen and the size of the first reference lumen is visualized based on the ratio between the size of the first visualization representation and the size of the second visualization representation; and
   generate diagnosis assistance information including the first visualization representation and the second visualization representation for a diagnosis of an aortic aneurysm in each of the plurality of aortic zones.

4. The medical image diagnosis assistance apparatus of claim 1, wherein the at least one processor is further configured to obtain a size of a second lumen including an area between the intima and an adventitia for each of the plurality of aortic zones as the first information for each of the plurality of aortic zones.

5. The medical image diagnosis assistance apparatus of claim 4, wherein the at least one processor is further configured to:
   generate the first visualization representation visualizing the size of the first lumen in each of the plurality of aortic zones;
   generate the second visualization representation visualizing the size of the second lumen in each of the plurality of aortic zones, wherein a ratio between the size of the first lumen and the size of the second lumen is visualized based on the ratio between the size of the first visualization representation and the size of the second visualization representation; and
   generate diagnosis assistance information including the first visualization representation and the second visualization representation for a diagnosis of an aortic dissection in each of the plurality of aortic zones.

6. The medical image diagnosis assistance apparatus of claim 4, wherein the at least one processor is further configured to:
   obtain a size of a first reference lumen corresponding to a size of a normal aorta of each of the plurality of aortic zones for each of the plurality of aortic zones; and
   generate a third visualization representation visualizing the size of the first reference lumen,
   such that the size of the first lumen, the size of the second lumen, and the size of the first reference lumen can be compared with each other.

7. The medical image diagnosis assistance apparatus of claim 1, wherein the at least one processor is further configured to:
   generate the first visualization representation having the size proportional to the size of the first lumen;
   generate the second visualization representation having the size proportional to the first information; and
   visualize the first visualization representation overlaying the second visualization representation, or visualize the first visualization representation adjacent to the second visualization representation, such that the size of the first lumen and the first information can be compared with each other.

8. A medical image diagnosis assistance apparatus for assisting a diagnosis of a medical image, the medical image diagnosis assistance apparatus comprising a computing system, wherein the computing system comprises:
   a communication interface configured to receive a medical image acquired for an anatomical structure inside a human body; and
   at least one processor, wherein the at least one processor is configured to:
      obtain a size of a first lumen including an area surrounded by an intima in each of a plurality of aortic zones and first information for each of the plurality of aortic zones based on results of segmentation of an aorta in the medical image and results of segmentation of the plurality of aortic zones within the aorta;
      visualize the size of the first lumen, the first information, and a ratio between the size of the first lumen and the first information in each of the plurality of aortic zones by using a visualization representation corresponding to each of the plurality of aortic zones; and
      generate the visualization representation having a first size corresponding to a ratio between a length of each of the plurality of aortic zones and a total length of the aorta.

9. The medical image diagnosis assistance apparatus of claim 1, wherein the at least one processor is further configured to generate the first and the second visualization representation including identification information indicating that the first and the second visualization representation corresponds to one of the plurality of aortic zones.

10. The medical image diagnosis assistance apparatus of claim 1, wherein the at least one processor is further configured to generate diagnosis assistance information for each of the plurality of aortic zones by disposing the first and the second visualization representation to correspond to a location of each of the plurality of aortic zones.

11. The medical image diagnosis assistance apparatus of claim 1, wherein the at least one processor is further configured to generate diagnosis assistance information for each of the plurality of aortic zones by radially disposing the first and the second visualization representation, sharing a center point of an imaginary circle, from a center point.

12. The medical image diagnosis assistance apparatus of claim 11, wherein the at least one processor is further configured to visualize the size of the first lumen and the first information in proportion to a length of a radius from the center point of the first and the second visualization representation.

13. A medical image diagnosis assistance method for assisting diagnosis of a medical image, the medical image diagnosis assistance method being performed by a medical image diagnosis assistance apparatus, wherein the medical image diagnosis assistance apparatus comprises at least one processor, the medical image diagnosis assistance method comprising:
receiving, by the at least one processor, a medical image acquired for an anatomical structure inside a human body via a communication interface;
obtaining, by the at least one processor, a size of a first lumen including an area surrounded by an intima in each of a plurality of aortic zones and first information for each of the plurality of aortic zones based on results of segmentation of an aorta in the medical image and results of segmentation of the plurality of aortic zones within the aorta; and
visualizing, by the at least one processor, the size of the first lumen based on a size of a first visualization representation in each of the plurality of aortic zones; and
visualizing, by the at least one processor, the first information based on a size of a second visualization representation in each of the plurality of aortic zones,
wherein a ratio between the size of the first lumen and the first information is visualized based on a ratio between the size of the first visualization representation and the size of the second visualization representation in each of the plurality of aortic zones.

14. The medical image diagnosis assistance method of claim 13, wherein the obtaining comprises obtaining, by the at least one processor, a size of a first reference lumen corresponding to a size of a normal aorta of each of the plurality of aortic zones as the first information for each of the plurality of aortic zones, and
wherein the medical image diagnosis assistance method further comprises:
generating, by the at least one processor, the first visualization representation visualizing the size of the first lumen in each of the plurality of aortic zones;
generating, by the at least one processor, the second visualization representation visualizing the size of the first reference lumen in each of the plurality of aortic zones, wherein a ratio between the size of the first lumen and the size of the first reference lumen is visualized based on the ratio between the size of the first visualization representation and the size of the second visualization representation; and
generating, by the at least one processor, diagnosis assistance information including the first visualization representation and the second visualization representation for a diagnosis of an aortic aneurysm in each of the plurality of aortic zones.

15. The medical image diagnosis assistance method of claim 13, wherein the obtaining comprises obtaining, by the at least one processor, a size of a second lumen including an area between the intima and an adventitia for each of the plurality of aortic zones as the first information for each of the plurality of aortic zones, and
wherein the medical image diagnosis assistance method further comprises:
generating, by the at least one processor, the first visualization representation visualizing the size of the first lumen in each of the plurality of aortic zones;
generate the second visualization representation visualizing the size of the second lumen in each of the plurality of aortic zones, wherein a ratio between the size of the first lumen and the size of the second lumen is visualized based on the ratio between the size of the first visualization representation and the size of the second visualization representation; and
generating, by the at least one processor, diagnosis assistance information including the first visualization representation and the second visualization representation for a diagnosis of an aortic dissection in each of the plurality of aortic zones.

16. The medical image diagnosis assistance method of claim 15, further comprising:
obtaining, by the at least one processor, a size of a first reference lumen corresponding to a size of a normal aorta of each of the plurality of aortic zones for each of the plurality of aortic zones;
generating, by the at least one processor, a third visualization representation visualizing the size of the first reference lumen,
such that the size of the first lumen, the size of the second lumen, and the size of the first reference lumen can be compared with each other.

17. The medical image diagnosis assistance method of claim 13, further comprising:
generating, by the at least one processor, the first visualization representation having the size proportional to the size of the first lumen; and
generating, by the at least one processor, the second visualization representation having the size proportional to the first information.

18. The medical image diagnosis assistance method of claim 13, further comprising:
generating, by the at least one processor, the first visualization representation having a first size corresponding to a ratio between a length of each of the plurality of aortic zones and a total length of the aorta and a second size corresponding to the size of the first lumen.

19. The medical image diagnosis assistance method of claim 13, further comprising:
generating, by the at least one processor, the first and the second visualization representation including identification information indicating that the first and the second visualization representation corresponds to one of the plurality of aortic zones; and
generating, by the at least one processor, diagnosis assistance information for each of the plurality of aortic zones by disposing the first and the second visualization representation to correspond to a location of each of the plurality of aortic zones.

20. The medical image diagnosis assistance method of claim 13, further comprising:

generating, by the at least one processor, diagnosis assistance information for each of the plurality of aortic zones by radially disposing the first and the second visualization representation, sharing a center point of an imaginary circle, from a center point.

* * * * *